US012581254B2

(12) United States Patent
Morris et al.

(10) Patent No.: US 12,581,254 B2
(45) Date of Patent: *Mar. 17, 2026

(54) CONVERTIBILITY OF A BONE CONDUCTION DEVICE

(71) Applicant: Cochlear Limited, Macquarie University (AU)

(72) Inventors: David Nathan Morris, Dover Heights (AU); Marcus Andersson, Gothenburg (SE); Göran Björn, Onsala (SE); Kristian Gunnar Asnes, Molnlycke (SE); Carl Van Himbeeck, Zottegem (BE)

(73) Assignee: Cochlear Limited, Macquarie University (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,244

(22) Filed: Feb. 13, 2024

(65) Prior Publication Data

US 2024/0187801 A1 Jun. 6, 2024

Related U.S. Application Data

(63) Continuation of application No. 18/092,498, filed on Jan. 3, 2023, now Pat. No. 11,910,166, which is a continuation of application No. 17/101,229, filed on Nov. 23, 2020, now Pat. No. 11,546,708, which is a continuation of application No. 16/542,632, filed on Aug. 16, 2019, now Pat. No. 10,848,883, which is a continuation of application No. 13/485,521, filed on (Continued)

(51) Int. Cl.

| | |
|---|---|
| ***H04R 25/00*** | (2006.01) |
| ***H04R 11/00*** | (2006.01) |

(52) U.S. Cl.

CPC .......... *H04R 25/606* (2013.01); *H04R 11/00* (2013.01); *H04R 2225/67* (2013.01); *H04R 2460/13* (2013.01)

(58) Field of Classification Search

CPC ...... H04R 2460/13; H04R 11/00; H04R 1/14; H04R 25/606; H04R 2225/67; A61N 1/36032; A61N 1/0541; A61F 11/04

USPC ........ 381/151, 326, 380; 600/25; 607/55, 57

See application file for complete search history.

(56) References Cited

U.S. PATENT DOCUMENTS 2,249,572 A 7/1941 Lieber
2,390,243 A 12/1945 Faltico (Continued)

FOREIGN PATENT DOCUMENTS

AU 2002237841 B2 3/2005
CA 2438969 A1 9/2002

(Continued)

OTHER PUBLICATIONS

Gerald A. Niznick, "Achieving Osseointegration in Soft Bone: The Search for Improved Results," Oral Health, Aug. 2000, pp. 27-32.

(Continued)

*Primary Examiner* — Sean H Nguyen

(74) *Attorney, Agent, or Firm* — Pilloff Passino & Cosenza LLP; Martin J. Cosenza

(57) ABSTRACT

An external component of a bone conduction device, including a vibrator and a platform configured to transfer vibrations from the vibrator to skin of the recipient, wherein the vibrator and platform are configured to quick connect and quick disconnect to and from, respectively, one another.

30 Claims, 26 Drawing Sheets

Related U.S. Application Data

May 31, 2012, now Pat. No. 10,419,861, which is a continuation-in-part of application No. 13/114,633, filed on May 24, 2011, now Pat. No. 8,787,608.

(56) References Cited

U.S. PATENT DOCUMENTS

| | | | |
|---|---|---|---|
| 2,487,038 | A | 11/1949 | Baum |
| 2,641,328 | A | 6/1953 | Beaudry |
| 2,678,973 | A | 5/1954 | Newman |
| 3,327,807 | A | 6/1967 | Mullin |
| 3,461,463 | A | 8/1969 | Beguin |
| 3,562,816 | A | 2/1971 | Hutchinson |
| 3,768,977 | A | 10/1973 | Brumfield et al. |
| 4,055,233 | A | 10/1977 | Huntress |
| 4,189,788 | A | 2/1980 | Schenke et al. |
| 4,333,469 | A | 6/1982 | Jeffcoat et al. |
| 4,488,561 | A | 12/1984 | Doring |
| 4,498,461 | A | 2/1985 | Hakansson |
| 4,532,930 | A | 8/1985 | Crosby et al. |
| 4,590,946 | A | 5/1986 | Loeb |
| 4,612,915 | A | 9/1986 | Hough et al. |
| 4,654,898 | A | 4/1987 | Ishikawa |
| 4,669,129 | A | 6/1987 | Chance |
| 4,744,792 | A | 5/1988 | Sander et al. |
| 4,791,673 | A | 12/1988 | Schreiber |
| 4,806,289 | A | 2/1989 | Laursen et al. |
| 4,878,560 | A | 11/1989 | Scott |
| 4,904,233 | A | 2/1990 | Hakansson et al. |
| 4,918,757 | A | 4/1990 | Janssen et al. |
| 4,986,831 | A | 1/1991 | King et al. |
| 4,997,056 | A | 3/1991 | Riley |
| 5,048,092 | A | 9/1991 | Yamagishi et al. |
| 5,074,375 | A | 12/1991 | Grozil |
| 5,176,620 | A | 1/1993 | Gilman |
| 5,208,867 | A | 5/1993 | Stites, III |
| 5,277,694 | A | 1/1994 | Leysieffer et al. |
| 5,282,253 | A | 1/1994 | Konomi |
| 5,285,530 | A | 2/1994 | Nardone, Jr. |
| 5,396,563 | A | 3/1995 | Yoshimi |
| 5,412,736 | A | 5/1995 | Keliiki |
| 5,443,493 | A | 8/1995 | Byers et al. |
| 5,469,505 | A | 11/1995 | Gattey et al. |
| 5,544,253 | A | 8/1996 | Nagayoshi et al. |
| 5,558,618 | A | 9/1996 | Maniglia |
| 5,572,594 | A | 11/1996 | Devoe et al. |
| 5,738,521 | A | 4/1998 | Dugot |
| 5,814,095 | A | 9/1998 | Muller et al. |
| 5,881,158 | A | 3/1999 | Lesinski et al. |
| 5,906,635 | A | 5/1999 | Maniglia |
| 5,950,244 | A | 9/1999 | Fournier et al. |
| 5,999,632 | A | 12/1999 | Leysieffer et al. |
| 6,042,380 | A | 3/2000 | De Rowe |
| 6,070,105 | A | 5/2000 | Kuzma |
| 6,125,302 | A | 9/2000 | Kuzma |
| 6,132,384 | A | 10/2000 | Christopherson et al. |
| 6,161,046 | A | 12/2000 | Maniglia et al. |
| 6,163,615 | A | 12/2000 | Callahan |
| 6,293,903 | B1 | 9/2001 | Kasic et al. |
| 6,381,336 | B1 | 4/2002 | Lesinski et al. |
| 6,427,086 | B1 | 7/2002 | Fischell et al. |
| 6,513,167 | B1 | 2/2003 | Cheng |
| 6,516,228 | B1 | 2/2003 | Berrang et al. |
| 6,537,200 | B2 | 3/2003 | Leysieffer et al. |
| 6,565,503 | B2 | 5/2003 | Leysieffer et al. |
| 6,575,894 | B2 | 6/2003 | Leysieffer et al. |
| 6,618,623 | B1 | 9/2003 | Pless et al. |
| 6,643,378 | B2 | 11/2003 | Schumaier |
| 6,678,897 | B2 | 1/2004 | Lindgren |
| 6,697,674 | B2 | 2/2004 | Leysieffer |
| 6,730,015 | B2 | 5/2004 | Schugt et al. |
| 6,840,919 | B1 | 1/2005 | Hakansson |
| 6,856,690 | B1 | 2/2005 | Skulley |
| 7,043,040 | B2 | 5/2006 | Westerkull |
| 7,072,476 | B2 | 7/2006 | White et al. |
| 7,120,939 | B1 | 10/2006 | Howard et al. |
| 7,231,056 | B2 | 6/2007 | Chen |
| 7,376,237 | B2 | 5/2008 | Westerkull |
| 7,796,771 | B2 | 9/2010 | Calhoun et al. |
| 7,937,156 | B2 | 5/2011 | Gibson |
| 7,974,700 | B1 | 7/2011 | Gibson |
| 8,170,252 | B2 | 5/2012 | Parker et al. |
| 8,515,115 | B2 | 8/2013 | Kelly et al. |
| 8,532,783 | B2 | 9/2013 | Zimmerling et al. |
| 8,787,608 | B2 | 7/2014 | Van Himbeeck et al. |
| 8,908,894 | B2 | 12/2014 | Amento et al. |
| 9,349,280 | B2 | 5/2016 | Baldwin et al. |
| 9,405,892 | B2 | 8/2016 | Baldwin et al. |
| 9,430,043 | B1 | 8/2016 | Amento et al. |
| 9,545,522 | B2 | 1/2017 | Gibson et al. |
| 9,582,071 | B2 | 2/2017 | Baldwin et al. |
| 9,589,482 | B2 | 3/2017 | Baldwin et al. |
| 9,594,433 | B2 | 3/2017 | Baldwin et al. |
| 9,600,079 | B2 | 3/2017 | Baldwin et al. |
| 9,715,774 | B2 | 7/2017 | Baldwin et al. |
| 9,882,992 | B2 | 1/2018 | Baldwin et al. |
| 10,419,861 | B2 | 9/2019 | Morris et al. |
| 2002/0019669 | A1 | 2/2002 | Berrang et al. |
| 2002/0091419 | A1 | 7/2002 | Firlik et al. |
| 2002/0138115 | A1 | 9/2002 | Baumann |
| 2002/0183014 | A1 | 12/2002 | Takeda et al. |
| 2003/0013407 | A1 | 1/2003 | Gagnon et al. |
| 2003/0114834 | A1 | 6/2003 | Mezzoli |
| 2004/0062411 | A1 | 4/2004 | Retchin et al. |
| 2004/0197002 | A1 | 10/2004 | Atsumi et al. |
| 2004/0260361 | A1 | 12/2004 | Gibson |
| 2006/0030852 | A1 | 2/2006 | Sevrain |
| 2006/0045298 | A1 | 3/2006 | Westerkull |
| 2006/0050913 | A1 | 3/2006 | Westerkull |
| 2006/0116743 | A1 | 6/2006 | Gibson et al. |
| 2006/0161255 | A1 | 7/2006 | Zarowski et al. |
| 2006/0199441 | A1 | 9/2006 | Germani |
| 2006/0251283 | A1 | 11/2006 | Yeh |
| 2007/0012507 | A1 | 1/2007 | Lyon |
| 2007/0053536 | A1 | 3/2007 | Westerkull |
| 2008/0107289 | A1 | 5/2008 | Retchin et al. |
| 2008/0205679 | A1 | 8/2008 | Darbut et al. |
| 2008/0310666 | A1 | 12/2008 | Wengreen |
| 2008/0319250 | A1 | 12/2008 | Asnes |
| 2009/0046874 | A1 | 2/2009 | Doman |
| 2009/0099658 | A1 | 4/2009 | Dalton et al. |
| 2009/0118828 | A1 | 5/2009 | Altmann |
| 2009/0185699 | A1 | 7/2009 | Kim |
| 2009/0226020 | A1 | 9/2009 | Abolfathi et al. |
| 2009/0245554 | A1 | 10/2009 | Parker |
| 2009/0292161 | A1 | 11/2009 | Parker |
| 2009/0304209 | A1 | 12/2009 | Nakatani |
| 2010/0137675 | A1 | 6/2010 | Parker |
| 2010/0330534 | A1 | 12/2010 | Hyun |
| 2011/0152601 | A1 | 6/2011 | Puria et al. |
| 2011/0160855 | A1 | 6/2011 | Gibson |
| 2011/0208303 | A1 | 8/2011 | Gibson |
| 2011/0264170 | A1 | 10/2011 | Gibson |
| 2011/0268303 | A1 | 11/2011 | Ahsani |
| 2011/0301729 | A1 | 12/2011 | Heiman et al. |
| 2011/0319021 | A1 | 12/2011 | Proulx et al. |
| 2012/0083860 | A1 | 4/2012 | Hakansson |
| 2012/0088956 | A1 | 4/2012 | Asnes et al. |
| 2012/0108887 | A1 | 5/2012 | Vermeiren |
| 2012/0215056 | A1 | 8/2012 | Hillbratt et al. |
| 2012/0294466 | A1 | 11/2012 | Kristo et al. |
| 2012/0302822 | A1 | 11/2012 | Van Himbeeck et al. |
| 2012/0302823 | A1 | 11/2012 | Andersson et al. |
| 2013/0018218 | A1 | 1/2013 | Haller et al. |
| 2013/0089229 | A1 | 4/2013 | Kristo et al. |
| 2013/0216078 | A1 | 8/2013 | Bewley |
| 2014/0064531 | A1 | 3/2014 | Andersson et al. |

FOREIGN PATENT DOCUMENTS

| | | | |
|---|---|---|---|
| EP | 0326905 | A1 | 8/1989 |
| EP | 3293986 | A1 | 3/2018 |
| JP | 2011087142 | A | 4/2011 |
| KR | 20090076484 | A | 7/2009 |
| RU | 2282426 | C1 | 8/2006 |

(56) References Cited

FOREIGN PATENT DOCUMENTS

| | | | |
|---|---|---|---|
| WO | 8300999 | A1 | 3/1983 |
| WO | 9429932 | A1 | 12/1994 |
| WO | 9705673 | A1 | 2/1997 |
| WO | 9736457 | A1 | 10/1997 |
| WO | 9906108 | A1 | 2/1999 |
| WO | 0071063 | A1 | 11/2000 |
| WO | 0110369 | A1 | 2/2001 |
| WO | 02084866 | A1 | 10/2002 |
| WO | 03070133 | A1 | 8/2003 |
| WO | 03092326 | A1 | 11/2003 |
| WO | 2004014269 | A1 | 2/2004 |
| WO | 2004014270 | A1 | 2/2004 |
| WO | 2007053882 | A1 | 5/2007 |
| WO | 2009099658 | A2 | 8/2009 |
| WO | 2013054293 | A1 | 4/2013 |

OTHER PUBLICATIONS

International Search Report & Written Opinion for PCT/IB2013/054518, mailed Nov. 18, 2013.
European Extended Search Report and Search Opinion for European Application No. 09753352.5 mailed Feb. 15, 2013.
International Search Report & Written Opinion for PCT/IB2012/052625 mailed Jan. 21, 2013.

CONVERTIBILITY OF A BONE CONDUCTION DEVICE

CROSS-REFERENCE TO RELATED APPLICATIONS

The present application is a Continuation application of U.S. patent application Ser. No. 18/092,498, filed Jan. 3, 2023, which is a Continuation application of U.S. patent application Ser. No. 17/101,229, filed Nov. 23, 2020, now U.S. Pat. No. 11,546,708, which is a Continuation application of U.S. patent application Ser. No. 16/542,632, filed Aug. 16, 2019, now U.S. Pat. No. 10,848,883, which is a Continuation application of U.S. patent application Ser. No. 13/485,521, filed May 31, 2012, now U.S. Pat. No. 10,419, 861, which is a Continuation in part of U.S. patent application Ser. No. 13/114,633, filed May 24, 2011, now U.S. Pat. No. 8,787,608, the entire contents of these applications being hereby incorporated by reference herein in their entirety.

BACKGROUND

The present invention relates generally to bone conduction devices, and more particularly, to convertibility of bone conduction devices.

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. For example, cochlear implants use an electrode array implanted in the cochlea of a recipient to bypass the mechanisms of the car. More specifically, an electrical stimulus is provided via the electrode array to the auditory nerve, thereby causing a hearing percept.

Conductive hearing loss occurs when the normal mechanical pathways that provide sound to hair cells in the cochlea are impeded, for example, by damage to the ossicular chain or car canal. Individuals suffering from conductive hearing loss may retain some form of residual hearing because the hair cells in the cochlea may remain undamaged.

Individuals suffering from conductive hearing loss typically receive an acoustic hearing aid. Hearing aids rely on principles of air conduction to transmit acoustic signals to the cochlea. In particular, a hearing aid typically uses a component positioned in the recipient's ear canal or on the outer ear to amplify a sound received by the outer ear of the recipient. This amplified sound reaches the cochlea causing motion of the perilymph and stimulation of the auditory nerve.

In contrast to hearing aids, certain types of hearing prostheses commonly referred to as bone conduction devices, convert a received sound into mechanical vibrations. The vibrations are transferred through the skull to the cochlea causing generation of nerve impulses, which result in the perception of the received sound. Bone conduction devices may be a suitable alternative for individuals who cannot derive sufficient benefit from acoustic hearing aids, cochlear implants, etc.

SUMMARY

In accordance with one aspect of the present invention, there is an external component of a bone conduction device, comprising a vibrator, and a platform configured to transfer vibrations from the vibrator to skin of the recipient, wherein the vibrator and platform are configured to quick release and quick connect from and to, respectively, one another.

In accordance with another aspect of the present invention, there is a method of converting a removable component of a percutaneous bone conduction device to an external component of a transcutaneous bone conduction device, the method comprising obtaining a vibrator configured to connect to a percutaneous abutment implanted in a recipient, and connecting a platform to the vibrator.

In accordance with another aspect of the present invention, there is a method of converting an external component of a transcutaneous bone conduction device including a vibrator to a removable component of a percutaneous bone conduction device, the method comprising, obtaining the vibrator, wherein the vibrator is configured to be detachably attached to pressure plate of the transcutaneous bone conduction device, and uncouplably coupling the vibrator to an implanted percutaneous abutment implanted in a recipient.

In accordance with another aspect of the present invention, there is an external platform for a passive transcutaneous bone conduction device, comprising a pressure plate configured to transmit hearing percept evoking vibrations, generated by an external vibrator of an external component of a bone conduction device and transmitted to the pressure plate, into skin of a recipient to input the vibrations into an implanted vibrating component attached to bone of a recipient, wherein the platform is configured to quick release and quick connect from and to, respectively, the external vibrator.

BRIEF DESCRIPTION OF THE DRAWINGS

Embodiments of the present invention are described below with reference to the attached drawings, in which.

DETAILED DESCRIPTION

Aspects of the present invention are generally directed to a bone conduction device that can be converted from a percutaneous bone conduction device to a passive transcutaneous bone conduction device, and visa-versa.

Figure 1:
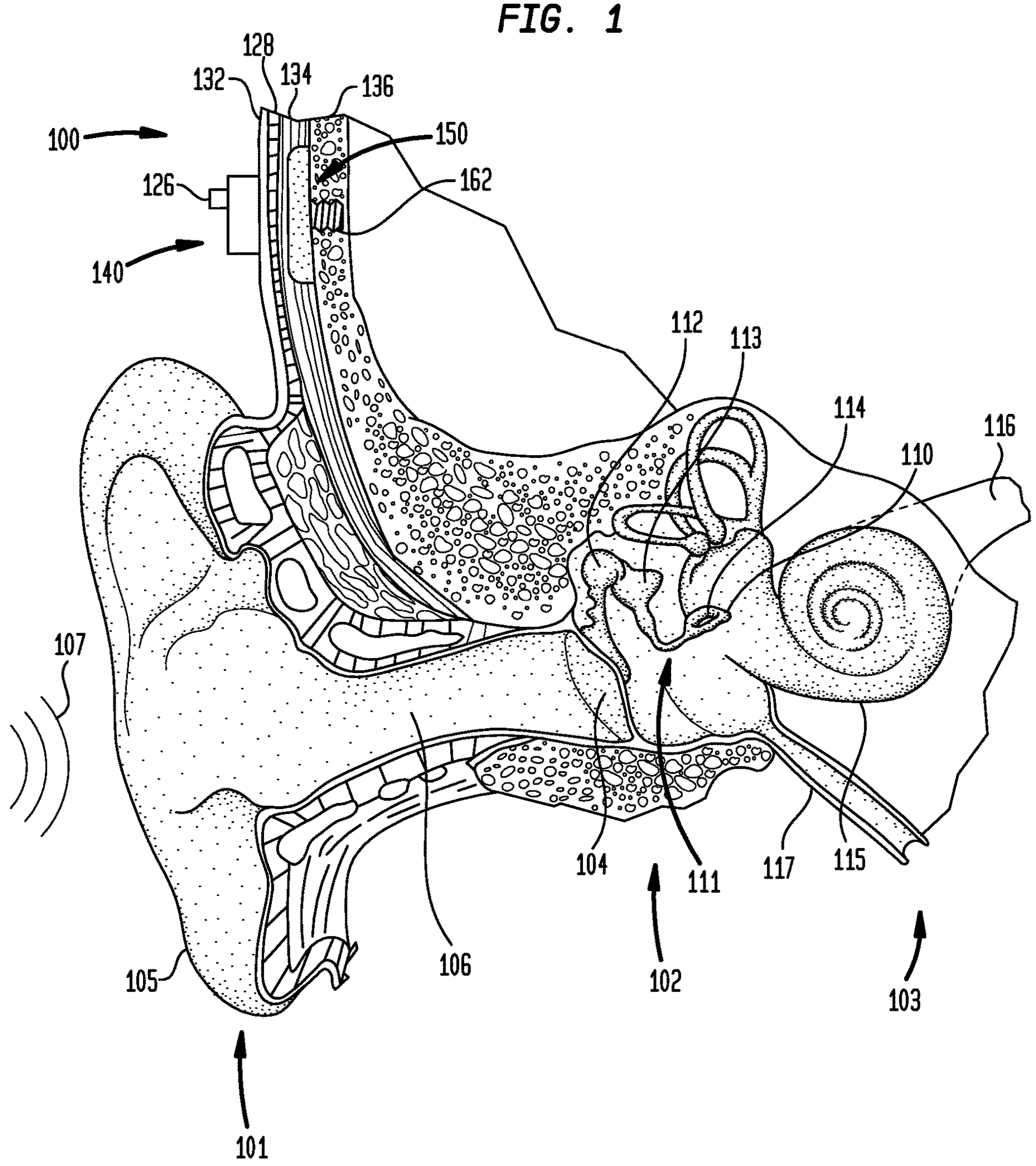
FIG. 1 is a perspective view of an exemplary bone conduction device in which embodiments of the present invention may be implemented.

FIG. 1 is a perspective view of a transcutaneous bone conduction device 100 in which embodiments of the present invention may be implemented. As shown, the recipient has an outer ear 101, a middle ear 102 and an inner ear 103. Elements of outer ear 101, middle ear 102 and inner ear 103 are described below, followed by a description of bone conduction device 100.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window or fenestra ovalis 110 through three bones of middle ear 102, collectively referred to as the ossicles 111 and comprising the malleus 112, the incus 113 and the stapes 114. The ossicles 111 of middle ear 102 serve to filter and amplify acoustic wave 107, causing oval window 110 to vibrate. Such vibration sets up waves of fluid motion within cochlea 139. Such fluid motion, in turn, activates hair cells (not shown) that line the inside of cochlea 139. Activation of the hair cells causes appropriate nerve impulses to be transferred through the spiral ganglion cells and auditory nerve 116 to the brain (not shown), where they are perceived as sound.

FIG. 1 also illustrates the positioning of bone conduction device 100 relative to outer ear 101, middle ear 102 and inner ear 103 of a recipient of device 100. As shown, bone conduction device 100 is positioned behind outer ear 101 of the recipient. Bone conduction device 100 comprises an external component 140 and implantable component 150. The bone conduction device 100 includes a sound input element 126 to receive sound signals. Sound input element 126 may comprise, for example, a microphone, telecoil, etc. In an exemplary embodiment, sound input element 126 may be located, for example, on or in bone conduction device 100, on a cable or tube extending from bone conduction device 100, etc. Alternatively, sound input element 126 may be subcutaneously implanted in the recipient, or positioned in the recipient's ear. Sound input element 126 may also be a component that receives an electronic signal indicative of sound, such as, for example, from an external audio device. For example, sound input element 126 may receive a sound signal in the form of an electrical signal from an MP3 player electronically connected to sound input element 126.

Bone conduction device 100 comprises a sound processor (not shown), an actuator (also not shown) and/or various other operational components. In operation, sound input device 126 converts received sounds into electrical signals. These electrical signals are utilized by the sound processor to generate control signals that cause the actuator to vibrate. In other words, the actuator converts the electrical signals into mechanical vibrations for delivery to the recipient's skull.

In accordance with embodiments of the present invention, a fixation system 162 may be used to secure implantable component 150 to skull 136. As described below, fixation system 162 may be a bone screw fixed to skull 136, and also attached to implantable component 150.

In one arrangement of FIG. 1, bone conduction device 100 is a passive transcutaneous bone conduction device. That is, no active components, such as the actuator, are implanted beneath the recipient's skin 132. In such an arrangement, the active actuator is located in external component 140, and implantable component 150 includes a magnetic plate, as will be discussed in greater detail below. The magnetic plate of the implantable component 150 vibrates in response to vibration transmitted through the skin, mechanically and/or via a magnetic field, that are generated by an external magnetic plate.

In another arrangement of FIG. 1, bone conduction device 100 is an active transcutaneous bone conduction device where at least one active component, such as the actuator, is implanted beneath the recipient's skin 132 and is thus part of the implantable component 150. As described below, in such an arrangement, external component 140 may comprise a sound processor and transmitter, while implantable component 150 may comprise a signal receiver and/or various other electronic circuits/devices.

Aspects of the present invention may also include the conversion of an implanted percutaneous bone conduction device to a transcutaneous bone conduction device. To this end, an exemplary percutaneous bone conduction device will be briefly described below.

Figure 2A:
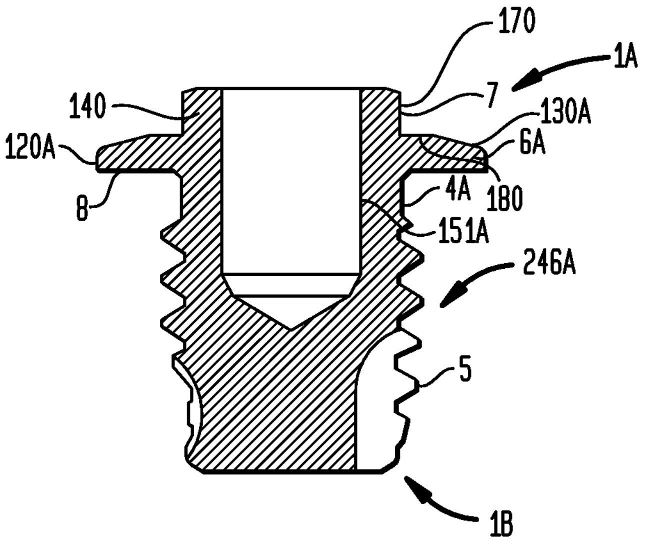
FIGS. 2A and 2B are schematic diagrams of exemplary bone fixtures with which embodiments of the present invention may be implemented.
Figure 2B:
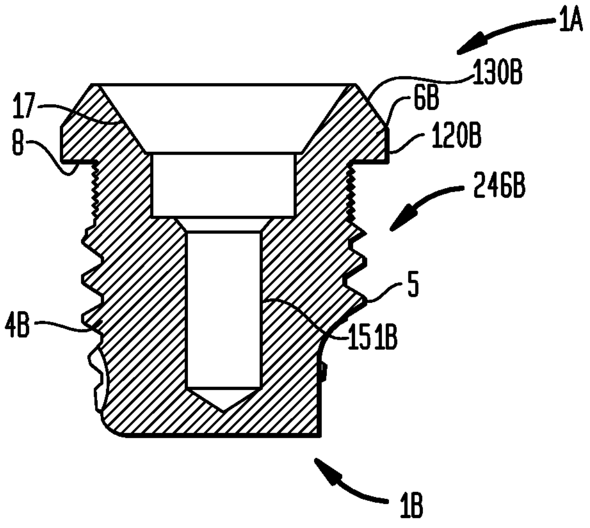

As previously noted, aspects of the present invention are generally directed to a bone conduction device including an implantable component comprising a bone fixture adapted to be secured to the skull, a vibratory element attached to the bone fixture, and a vibration isolator disposed between the vibratory element and the recipient's skull. FIGS. 2A and 2B are cross-sectional views of bone fixtures 246A and 246B that may be used in exemplary embodiments of the present invention. Bone fixtures 246A and 246B are configured to receive an abutment as is known in the art, where an abutment screw is used to attach the abutment to the bone fixtures, as will be detailed below.

Bone fixtures 246A and 246B may be made of any material that has a known ability to integrate into surrounding bone tissue (i.e., it is made of a material that exhibits acceptable osseointegration characteristics). In one embodiment, the bone fixtures 246A and 246B are made of titanium.

As shown, fixtures 246A and 246B each include main bodies 4A and 4B, respectively, and an outer screw thread 5 configured to be installed into the skull. The fixtures 246A and 246B also each respectively comprise flanges 6A and 6B configured to prevent the fixtures from being inserted too far into the skull. Fixtures 246A and 246B may further comprise a tool-engaging socket having an internal grip section for easy lifting and handling of the fixtures. Tool-engaging sockets and the internal grip sections usable in bone fixtures according to some embodiments of the present invention are described and illustrated in U.S. Provisional Application No. 60/951,163, entitled "Bone Anchor Fixture for a Medical Prosthesis," filed Jul. 20, 2007.

Main bodies 4A and 4B have a length that is sufficient to securely anchor the bone fixtures into the skull without penetrating entirely through the skull. The length of main bodies 4A and 4B may depend, for example, on the thickness of the skull at the implantation site. In one embodiment, the main bodies of the fixtures have a length that is no greater than 5 mm, measured from the planar bottom surface 8 of the flanges 6A and 6B to the end of the distal region 1B. In another embodiment, the length of the main bodies is from about 3.0 mm to about 5.0 mm.

In the embodiment depicted in FIG. 2A, main body 4A of bone fixture 246A has a cylindrical proximate end 1A, a straight, generally cylindrical body, and a screw thread 5. The distal region 1B of bone fixture 246A may be fitted with self-tapping cutting edges formed into the exterior surface of the fixture. Further details of the self-tapping features that may be used in some embodiments of bone fixtures used in embodiments of the present invention are described in International Patent Application WO 02/09622.

Additionally, as shown in FIG. 2A, the main body of the bone fixture 246A has a tapered apical proximate end 1A, a straight, generally cylindrical body, and a screw thread 5. The distal region 1B of bone fixtures 246A and 246B may also be fitted with self-tapping cutting edges (e.g., three edges) formed into the exterior surface of the fixture.

A clearance or relief surface may be provided adjacent to the self-tapping cutting edges in accordance with the teachings of U.S. Patent Application Publication No. 2009/0082817. Such a design may reduce the squeezing effect between the fixture 246A and the bone during installation of the screw by creating more volume for the cut-off bone chips.

As illustrated in FIGS. 2A-2B, flanges 6A and 6B have a planar bottom surface for resting against the outer bone surface, when the bone fixtures have been screwed down into the skull. In an exemplary embodiment, the flanges 6A and 6B have a diameter which exceeds the peak diameter of the screw threads 5 (the screw threads 5 of the bone fixtures 246A and 246B may have an outer diameter of about 3.5-5.0 mm). In one embodiment, the diameter of the flanges 6A and 6B exceeds the peak diameter of the screw threads 5 by approximately 10-20%. Although flanges 6A and 6B are illustrated in FIGS. 2A-2B as being circumferential, the flanges may be configured in a variety of shapes. Also, the size of flanges 6A and 6B may vary depending on the particular application for which the bone conduction implant is intended.

In FIG. 2B, the outer peripheral surface of flange 6B has a cylindrical part 120B and a flared top portion 130B. The upper end of flange 6B is designed with an open cavity having a tapered inner side wall 17. The tapered inner side wall 17 is adjacent to the grip section (not shown).

It is noted that the interiors of the fixtures 246A and 246B further respectively include an inner bottom bore 151A and 151B having internal screw threads for securing a coupling shaft of an abutment screw to secure respective abutments to the respective bone fixtures as will be described in greater detail below.

In FIG. 2A, the upper end 1A of fixture 246A is designed with a cylindrical boss 140 having a coaxial outer side wall 170 extending at a right angle from a planar surface 180A at the top of flange 6A.

In the embodiments illustrated in FIGS. 2A and 2B, the flanges 6A and 6B have a smooth, open upper end and do not have a protruding hex. The smooth upper end of the flanges and the absence of any sharp corners provides for improved soft tissue adaptation. Flanges 6A and 6B also comprises a cylindrical part 120A and 120B, respectively, that together with the flared upper parts 130A and 130B, respectively, provides sufficient height in the longitudinal direction for internal connection with the respective abutments that may be attached to the bone fixtures.

Figure 3:
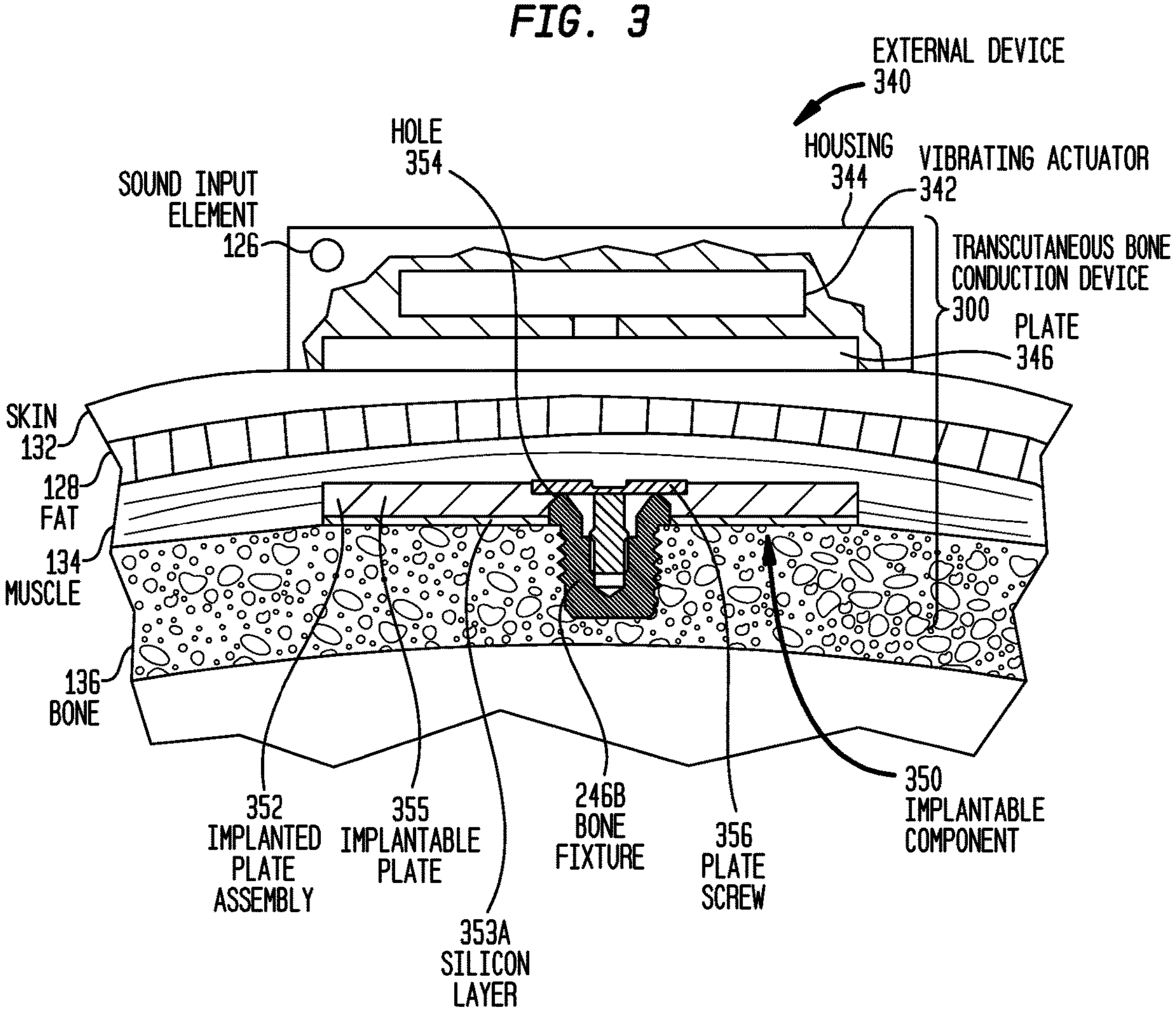
FIG. 3 is a schematic diagram illustrating an exemplary passive transcutaneous bone conduction device in which embodiments of the present invention may be implemented.

FIG. 3 depicts an exemplary embodiment of a transcutaneous bone conduction device 300 according to an embodiment of the present invention that includes an external device 340 and an implantable component 350. The transcutaneous bone conduction device 300 of FIG. 3 is a passive transcutaneous bone conduction device in that a vibrating actuator 342 is located in the external device 340. Vibrating actuator 342 is located in housing 344 of the external component, and is coupled to plate 346. Plate 346 may be in the form of a permanent magnet and/or in another form that generates and/or is reactive to a magnetic field, or otherwise permits the establishment of magnetic attraction between the external device 340 and the implantable component 350 sufficient to hold the external device 340 against the skin of the recipient.

In an exemplary embodiment, the vibrating actuator 342 is a device that converts electrical signals into vibration. In operation, sound input element 126 converts sound into electrical signals. Specifically, the transcutaneous bone conduction device 300 provides these electrical signals to vibrating actuator 342, or to a sound processor (not shown) that processes the electrical signals, and then provides those processed signals to vibrating actuator 342. The vibrating actuator 342 converts the electrical signals (processed or unprocessed) into vibrations. Because vibrating actuator 342 is mechanically coupled to plate 346, the vibrations are transferred from the vibrating actuator 342 to plate 346. Implanted plate assembly 352 is part of the implantable component 350, and is made of a ferromagnetic material that may be in the form of a permanent magnet, that generates and/or is reactive to a magnetic field, or otherwise permits the establishment of a magnetic attraction between the external device 340 and the implantable component 350 sufficient to hold the external device 340 against the skin of the recipient. Accordingly, vibrations produced by the vibrating actuator 342 of the external device 340 are transferred from plate 346 across the skin to plate 355 of plate assembly 352. This may be accomplished as a result of mechanical conduction of the vibrations through the skin, resulting from the external device 340 being in direct contact with the skin and/or from the magnetic field between the two plates. These vibrations are transferred without penetrating the skin with a solid object such as an abutment as detailed herein with respect to a percutaneous bone conduction device.

As may be seen, the implanted plate assembly 352 is substantially rigidly attached to bone fixture 246B in this embodiment. As indicated above, bone fixture 246A or other bone fixture may be used instead of bone fixture 246B in this and other embodiments. In this regard, implantable plate assembly 352 includes through hole 354 that is contoured to the outer contours of the bone fixture 246B. This through hole 354 thus forms a bone fixture interface section that is contoured to the exposed section of the bone fixture 246B. In an exemplary embodiment, the sections are sized and dimensioned such that at least a slip fit or an interference fit exists with respect to the sections. Plate screw 356 is used to secure plate assembly 352 to bone fixture 246B. As can be seen in FIG. 3, the head of the plate screw 356 is larger than the hole through the implantable plate assembly 352, and thus the plate screw 356 positively retains the implantable plate assembly 352 to the bone fixture 246B. The portions of plate screw 356 that interface with the bone fixture 246B substantially correspond to an abutment screw detailed in greater detail below, thus permitting plate screw 356 to readily fit into an existing bone fixture used in a percutaneous bone conduction device. In an exemplary embodiment, plate screw 356 is configured so that the same tools and procedures that are used to install and/or remove an abutment screw (described below) from bone fixture 246B can be used to install and/or remove plate screw 356 from the bone fixture 246B.

Figure 4:
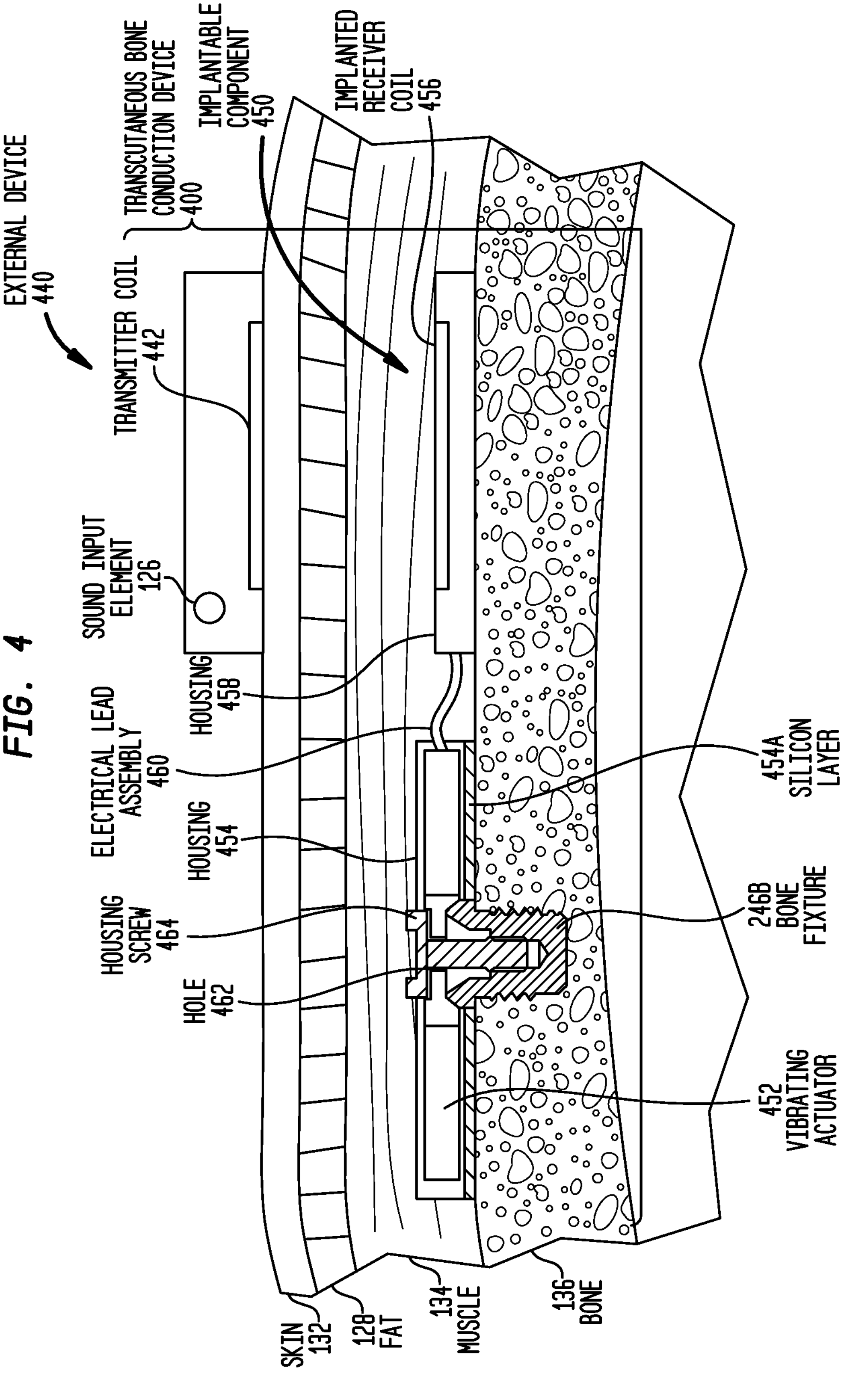
FIG. 4 is a schematic diagram illustrating an exemplary active transcutaneous bone conduction device in which embodiments of the present invention may be implemented.

FIG. 4 depicts an exemplary embodiment of a transcutaneous bone conduction device 400 according to another embodiment of the present invention that includes an external device 440 and an implantable component 450. The transcutaneous bone conduction device 400 of FIG. 4 is an active transcutaneous bone conduction device in that the vibrating actuator 452 is located in the implantable component 450. Specifically, a vibratory element in the form of vibrating actuator 452 is located in housing 454 of the implantable component 450. In an exemplary embodiment, much like the vibrating actuator 342 described above with respect to transcutaneous bone conduction device 300, the vibrating actuator 452 is a device that converts electrical signals into vibration.

External component 440 includes a sound input element 126 that converts sound into electrical signals. Specifically, the transcutaneous bone conduction device 400 provides these electrical signals to vibrating actuator 452, or to a sound processor (not shown) that processes the electrical signals, and then provides those processed signals to the implantable component 450 through the skin of the recipient via a magnetic inductance link. In this regard, a transmitter coil 442 of the external component 440 transmits these signals to implanted receiver coil 456 located in housing 458 of the implantable component 450. Components (not shown) in the housing 458, such as, for example, a signal generator or an implanted sound processor, then generate electrical signals to be delivered to vibrating actuator 452 via electrical lead assembly 460. The vibrating actuator 452 converts the electrical signals into vibrations.

The vibrating actuator 452 is mechanically coupled to the housing 454. Housing 454 and vibrating actuator 452 collectively form a vibrating element. The housing 454 is substantially rigidly attached to bone fixture 246B. In this regard, housing 454 includes through hole 462 that is contoured to the outer contours of the bone fixture 246B. Housing screw 464 is used to secure housing 454 to bone fixture 246B. The portions of housing screw 464 that interface with the bone fixture 246B substantially correspond to the abutment screw detailed below, thus permitting housing screw 464 to readily fit into an existing bone fixture used in a percutaneous bone conduction device (or an existing passive bone conduction device such as that detailed above). In an exemplary embodiment, housing screw 464 is configured so that the same tools and procedures that are used to install and/or remove an abutment screw from bone fixture 246B can be used to install and/or remove housing screw 464 from the bone fixture 246B.

More detailed features of the embodiments of FIG. 3 and FIG. 4 will now be described.

Figure 5A:
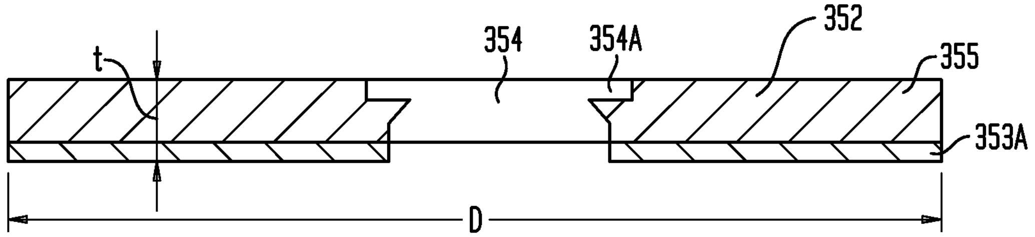
FIG. 5A is a schematic diagram illustrating an exemplary portion of the implantable component of a passive transcutaneous bone conduction device according to an embodiment of the present invention.

Referring back to FIGS. 3 and 4, the through hole 354 depicted in FIG. 3 for plate screw 354 and through hole 462 depicted in FIG. 4 for housing screw 464 may include a section that provides space for the head of the screw (e.g., 354A as illustrated in FIG. 5A). This permits the top of the respective screws to sit flush with, below or only slightly proud of the top surface of the plate 355 or housing 454, respectively. However, in other embodiments, the entire head of the plate screw 356 or housing screw 456 sits proud of the top surface of the respective plate assembly 352 and housing 454.

Figure 5B:
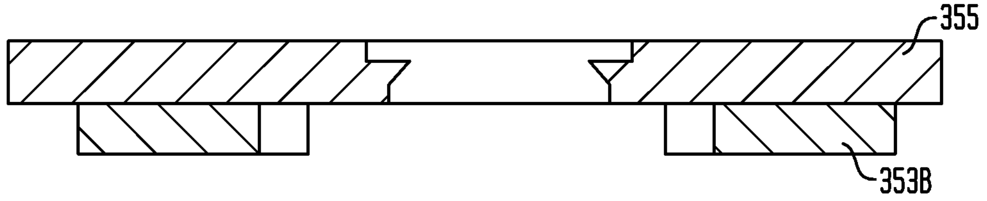
FIG. 5B is a schematic diagram illustrating another exemplary portion of the implantable component of a passive transcutaneous bone conduction device according to an embodiment of the present invention.

As noted above, implanted plate assembly 352 is substantially rigidly attached to bone fixture 246B to form the implantable component 350. The attachment formed between the implantable plate assembly 352 and the bone fixture 246B is one that inhibits the transfer of vibrations of the implantable plate assembly 352 to the bone fixture 246B as little as possible. Moreover, an embodiment of the present invention is directed towards vibrationally isolating the implantable plate assembly 352 from the skull 136 as much as possible. That is, an embodiment of the present invention is directed to an implantable component 340 that, except for a path for the vibrational energy through the bone fixture, the vibratory element is vibrationally isolated from the skull. In this regard, an embodiment of the implantable plate assembly 352 includes a silicon layer 353A or other biocompatible vibrationally isolating substance interposed between an implantable plate 355, corresponding to a vibratory element, and the skull 136, as may be seen in FIG. 5A. Thus, in the embodiment of FIG. 5A, the plate assembly 352 includes implantable plate 355 and silicon layer 352A. The silicon layer 353A corresponds to a vibration isolator and attenuates some of the vibrational energy that is not transmitted to the skull 136 through the bone fixture 246B. In some embodiments, a silicon layer 353A is in the form of a coating that covers only the bottom surface (i.e., the surface facing the skull 136) of the implantable plate 355 as shown in FIG. 5A, while in other embodiments, silicon covers the sides and/or the top of the implantable plate 355. The silicon layer is attached to the outer surface of the implantable plate 355. In some embodiments, silicon only covers portions of the bottom, sides and/or top, as is depicted by way of example in FIG. 5B, where a plurality of separate silicon pillars 353B are located on the bottom surface of the implantable plate 355. In some embodiments, the vibration isolator comprises a substantially planar ring disposed substantially around the outer surface of the bone fixture. This ring may be a single piece or may be formed by multiple sections linked together. Accordingly, an embodiment of the vibration isolator includes a plurality of projections extending from the surface of the isolator abutting the skull. Any arrangement of a vibrationally isolating substance that will permit embodiments of the present invention to be practiced may be used in some embodiments. It is noted that in most embodiments, little or no silicon is located between the implantable plate 355 and the bone fixture 246B. That is, there is direct contact between the implantable plate 355 and the bone fixture 246B. In some embodiments, this contact is in the form of a slip fit or is in the form of a slight interference fit.

Figure 5C:
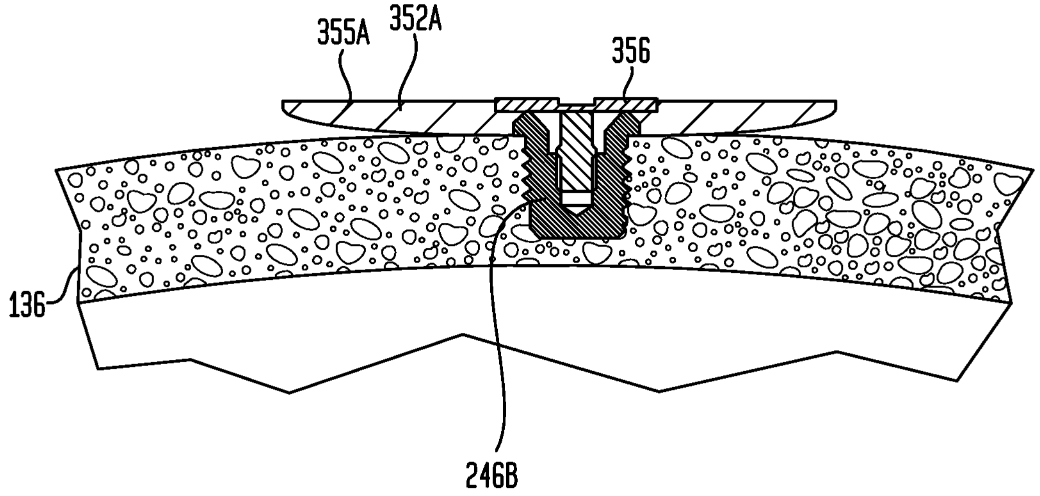
FIG. 5C is a schematic diagram illustrating another exemplary portion of the implantable component of a passive transcutaneous bone conduction device according to an embodiment of the present invention.
Figure 5D:
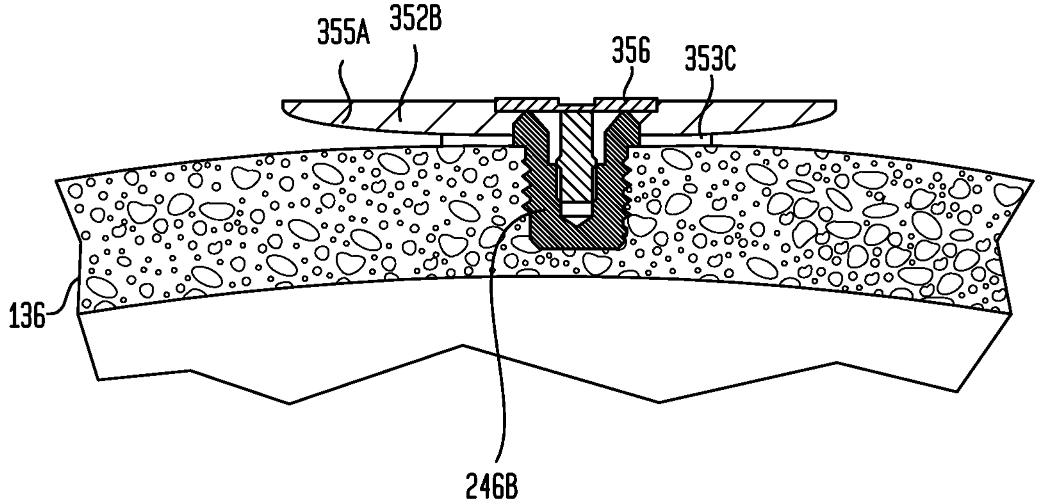
FIG. 5D is a schematic diagram illustrating another exemplary portion of the implantable component of a passive transcutaneous bone conduction device according to an embodiment of the present invention.

Moreover, in some embodiments, some or all of the implantable plate is held above the skull 136 so that there is little to no direct contact between the skull 136 and the implantable plate assembly 352. FIG. 5C depicts an exemplary implantable plate assembly 352A that includes an implantable plate 355A. In some such embodiments, tissue other than bone that is a poor conductor of vibration is encouraged to grow in the resulting space between the skull 136 and the implantable plate 355A. Also, a layer of silicon may be interposed between the implantable plate 355A and the skull 136, to further isolate the vibrations in a manner consistent with that detailed above. In this regard, FIG. 5D depicts an exemplary implantable plate assembly 352B that includes implantable plate 355A and silicon layer 353C. Silicon layer 353C may inhibit the build-up of material and/or inhibit the growth of tissue between the implantable plate 355A and the skull 136 that might otherwise create an alternate path for vibrational energy to be transmitted from the implantable plate 355A to the skull 136. As would be understood, such build-up of material/growth of tissue that provides an alternate path for vibrational energy from the implantable plate 355A might negatively affect the long-term performance of the bone conduction device. For example, continued build-up of material/growth of tissue might create, at a certain point in time after implantation, a bridge between the skull 136 and the implantable plate 355A. This might result in a relatively sudden change in the performance characteristics of the bone conduction device. Using silicon layer 353C (or other applicable vibration isolator) thus may provide an immediate improvement of the bone conduction device while also preserving that performance in the long-term. In some embodiments, the vibration isolator may include a substance that inhibits bone growth. The use of the vibration isolator to inhibit the build-up of material and/or to inhibit the growth of tissue between the vibratory element and the skull may be applicable to any of the embodiments disclosed herein and variations thereof.

In some exemplary embodiments, the vibration isolator is positioned in such a manner to reduce the risk of infection resulting from the presence of a gap between the skull 136 and the implantable plate 355. The vibration isolator may also be used to eliminate cracks and crevices that may exist in the plate 355 and/or the skull 136 that sometimes trap material therein, resulting in infections. It is to be understood that while the following description is directed to the embodiment of FIG. 3, the description is also applicable to the other embodiments disclosed herein and variations thereof. In an exemplary embodiment, the vibration isolator is configured to substantially completely fill the gap between the implantable plate 355 and the skull 136 and/or crevices therein. In some embodiments, the vibration isolator is configured to closely conform to the bone fixture 246B, such as is depicted in FIGS. 3 and 4, to reduce the risk of infection. Along these lines, the vibration isolator may have elastic properties permitting it to stretch around bone fixture 246B, thereby snugly conforming to the bone fixture 246B. The vibration isolator may include a material that is known to reduce the risk of infection and/or may be impregnated with an antibiotic. In an exemplary embodiment of the invention, the vibration isolator is a drug eluding device that eludes an antibiotic for a period of time after implantation.

In some embodiments of the present invention, the vibration isolator is configured such that once it is positioned between the skull 136 and the implantable plate assembly 352, the outer periphery of the vibration isolator extends away from the skull in a direction normal to the skull, as may be seen in FIG. 3. In some embodiments, the outer periphery extends from the skull in a substantially uniform manner, also as may be seen in FIG. 3. In other embodiments, the outer periphery of the vibration isolator extends away from the skull at an angle other than an angle normal to the surface of the skull, thereby establishing a less-abrupt transition/smoother transition that that depicted in FIG. 3. In some embodiments, the outer periphery of the vibration isolator extends away from the skull in a curved manner (e.g., semi-circular, parabolic, etc.). Any configuration that will permit the vibration isolator to smoothly extend from the skull may be used in some embodiments of the present invention.

Accordingly, the implantable component 350 is configured, in at least some embodiments, to deliver as much of the vibrational energy of implantable plate assembly 352 as possible into the skull 136 via transmission from the implantable plate assembly 352 through bone fixture 246B. Also, the implantable component 350 is configured, in at least some embodiments, to deliver as little of the vibrational energy of implantable plate assembly 352 directly into the skull 136 from the implantable plate assembly 352 as possible. An embodiment of such an implantable component 350 alleviates, at least in part, the wave propagation effect that is present as an acoustic wave propagates through a human skull, as will now be detailed.

Implantable component 350 limits the conductive channel through which vibrations enter the skull to a small area. With respect to implantable plate assembly 352, this is the area taken up by bone fixture 246B as measured on a plane tangential to the skull 136 centered at about the longitudinal axis of the bone fixture 246B. This area has a diameter that is smaller than the wavelength of the vibrations. By way of example, for vibrations having a wavelength of about 10-20 cm, the diameter of the area of the conductive channel (area taken up by bone fixture 246B) is about 3-20% of the wavelength. By comparison, if the vibrations were conducted into the skull directly from the implantable plate assembly 352, the diameter of the area of the conductive channel (area taken up by implantable plate assembly 352 as measured on a plane tangential to the skull 136 centered at about the longitudinal axis of the implantable plate assembly 352), would be a higher percentage than that of the implantable component 350 of FIG. 3, thus reducing efficiency. This is also the case with implantable plate assembly 352B, which utilizes the silicon layer 353C.

With regard to implantable plate assembly 352A, the conductive channel through which vibrations enter the skull is also limited to a small area. However, this area is the area taken up by bone fixture 246B and the portion of plate 355A that contacts skull 136, again as measured on a plane tangential to the skull 136 centered at about the longitudinal axis of the bone fixture 246B. In some embodiments, this area has a diameter that is smaller than the wavelength of the vibrations. Again by way of example, for vibrations having a wavelength of about 10-20 cm, the diameter of the area of the conductive channel (area taken up by bone fixture 246B plus the portion of plate 355A) is about 3-20% of the wavelength, notwithstanding the fact that the implantable plate assembly 352A may have an outer periphery that encompasses an area that is larger than this. That is, the implantable plate assembly 352A has a maximum outer periphery that has a corresponding maximum outer peripheral diameter, and with respect to the embodiment of FIG. 5C, where plate 355A is a circular disk, the outer periphery is the outer diameter of the disk. The implantable plate assembly 352A also includes a maximum bone contact surface area having a maximum contact surface diameter. This is the surface area of the plate 355A that directly contacts the skull 136. That is, the plate 355A only contacts the skull 136 at the maximum bone contact surface area. With respect to the embodiment of FIG. 5C, the maximum contact surface diameter is equal to or less than about half of the maximum outer peripheral diameter of the implantable plate assembly 352A. In some embodiments, the maximum outer peripheral diameter of the implantable plate assembly 352A is equal to or less than about a quarter of the maximum outer peripheral diameter of the implantable plate assembly 352A.

Accordingly, an embodiment of the present invention includes an implantable component 350 as described above configured to deliver more, substantially more and/or substantially all of the vibrational energy from an implanted vibratory element to the skull through the bone fixture 246B than directly from the implanted vibratory element to the skull.

As detailed above, the implantable plate assembly 352 may also be used to magnetically hold the external component 340 to the recipient, either as a result of the implantable plate assembly 352 comprising a permanent magnet or as a result of the implantable plate assembly 352 comprising a ferromagnetic material that reacts to a magnetic field (such as, for example, that generated by a permanent magnet located in the external component 340). Accordingly, some embodiments of the implantable plate assembly 352 should include a sufficient amount of the ferromagnetic material (and/or a sufficient area facing the external component 340) to magnetically hold the external component 340 to the recipient. In an exemplary embodiment, referring to FIG. 5A, the implantable plate assembly 352 is substantially circular, having an outer diameter of about 40 mm and having a thickness of about 4-5 mm, of which about 0.5 to 1.0 mm is silicon on the bottom and/or on the top. Also, in some embodiments, the implantable plate assembly 352 may be strengthened with ribs, either formed as an integral part of implantable plate 355 or in the form of a composite plate assembly. In other embodiments, the implantable plate assembly 352 is oval or substantially rectangular in shape (square or a rectangle having a length greater than a width). It is noted that in other embodiments of the present invention, the external device 340 or external device 440 is held in place via a means other than a magnetic field. By way of example, the external devices may be held in place via a harness such as a band that extends about the head of the recipient. In some such embodiments, the implanted plates may or may not be made of a magnetic material. In some embodiments of the passive bone conduction devices, the implanted plates may be any plate that vibrates as a result of the mechanical conduction of the vibrations from the external device to the implanted plate.

With respect to the embodiment of FIG. 4, as noted above, housing 454 is substantially rigidly attached to bone fixture 246B. The attachment formed between the housing 454 and the bone fixture 246B is one that inhibits the transfer of vibrations from the vibrating actuator 452 through the housing 454 to the bone fixture 246B as little as possible. Moreover, an embodiment of the present invention is directed towards vibrationally isolating the housing 454 from the skull 136 as much as possible, as is the case with the implantable plate assembly 352 detailed above. In this regard, an embodiment of the housing 454 includes a silicon layer 454A or other biocompatible vibrationally isolating substance interposed between the housing 454 and the skull 136. In some embodiments, a silicon layer 454A covers only the bottom surface (i.e., the surface facing the skull 136) of the housing 454 as shown in FIG. 4, while in other embodiments, silicon covers the sides and/or the top of the housing 454. In some embodiments, silicon only covers portions of the bottom, sides and/or top, in a manner analogous to that described above with respect to the implantable plate assembly 352. Any arrangement of a vibrationally isolating substance that will permit embodiments of the present invention to be practiced may be used in some embodiments.

It is noted that in most embodiments, little or no silicon is located between the housing 454 and the bone fixture 246B. That is, there is direct contact between the housing 454 and the bone fixture 246B. In some embodiments, this contact is in the form of a slip fit or is in the form of a slight interference fit. Further, it is noted that in some embodiments, the vibrating actuator 452 is mechanically coupled to the housing in such a manner as to increase the vibrational energy transferred from the vibrating actuator 452 to the bone fixture 246B as much as possible. In an exemplary embodiment, the vibrating actuator 452 is coupled to the walls of the hole 462 in a manner that enhances vibrational transfer through the walls and/or is vibrationally isolated from other portions of the housing 452 in a manner that inhibits vibrational transfer through those other portions of the housing 452.

Moreover, in some embodiments, some or all of the housing 452 is held above the skull 136 so that there is less or no direct contact between the skull 136 and the housing 452. In this regard, embodiments of the housing 452 may take an outer form corresponding to that detailed above with respect to implantable plate assembly 352A.

Accordingly, as with the implantable plate assembly 352 described above, the housing 452 is configured, in at least some embodiments, to channel as much of the vibrational energy of the vibrating actuator 452 as possible into the skull 136 via transmission from the housing 454 through bone fixture 246B. Also, as with the implantable component 350 described above, the housing 454 is configured, in at least some embodiments, to channel as little of the vibrational energy of the vibrating actuator 452 directly into the skull 136 from the housing 454 as possible. An embodiment of such housing 454 alleviates, at least in part, the wave propagation effect that is present as an acoustic wave propagates through a human skull detailed above.

It is noted that in some embodiments, housing 454 is not present and/or is not directly connected to bone fixture 246B as depicted in FIG. 4. Instead, a vibrating actuator is directly attached to the bone fixture 246B, and any components that need be shielded from body fluids are contained in a separate housing and/or the vibrating actuator does not include components that need shielding. In an exemplary embodiment, such a vibrating actuator may be a piezoelectric actuator.

In view of the various bone conduction devices detailed above, embodiments of the present invention include methods of enhancing hearing by delivering vibrational energy to a skull via an implantable component such as implantable components 300 and 400 detailed above. In an exemplary embodiment, as a first step the method comprises capturing sound with, for example, sound capture device 126 detailed above. In a second step, the captured sound signals are converted to electrical signals. In a third step, the electrical signals are outputted to a vibrating actuator configured to vibrate a vibratory element. Such a vibrating actuator may be, for example, vibrating actuator 342 of FIG. 3 configured to vibrate implantable plate assembly 352, or vibrating actuator 452, which is implanted in a recipient and where the vibratory element is part of the vibrating actuator 452. In a subsequent step, a majority of the vibrational energy from the vibrating device is conducted to the skull via an artificial pathway comprising implanted structural components extending from the vibrational device to and into the skull, thereby enhancing hearing.

In an exemplary embodiment, the artificial pathway includes any of the bone fixtures detailed herein. As may be seen in FIG. 3 and as detailed above, where the vibrating device is the implanted plate assembly 352, the artificial pathway of this method includes a section having a maximum outer diameter when measured on a first plane tangential to and on the surface of the skull at the location where the artificial pathway extends to and into the skull, of about 1% to about 20% of the wavelength of the vibrations producing the vibrational energy. In an exemplary embodiment, this diameter may correspond to the outer diameter of the bone fixture where the bone fixture enters the skull. Moreover, in an embodiment of this method, the implanted plate assembly 352 has a maximum outer diameter when measured on a second plane substantially parallel to the first plane, where the maximum outer diameter of the artificial pathway is about 5% to about 35% of the maximum outer diameter of the implanted plate assembly 352. The act of conducting a majority of the vibrational energy from the vibrating device to the skull via the artificial pathway, as opposed to, for example, directly conducting the vibrational energy from the implanted plate assembly 352 to the skull, is achieved by vibrationally isolating the implanted plate assembly 352 from the skull and rigidly coupling the implanted plate assembly 352 to the bone fixture 246B as detailed above.

It is noted that in some embodiments of this method, substantially more of the vibrational energy from the implanted plate assembly is conducted to the skull through the artificial pathway than is conducted to the skull outside of the artificial pathway. In yet other embodiments, substantially all of the vibrational energy from the implanted plate assembly is conducted to the skull through the artificial pathway.

In some embodiments, the silicon layers detailed herein inhibit osseointegration of the implantable plate 355 and the housing 454 to the skull. This permits the implantable plate 355 and/or housing 454 to be more easily removed from the recipient. Such removal may be done in the event that the implantable plate 355 and/or the housing 454 are damaged and a replacement is necessary, or simply an upgrade to those components is desired. Also, such removal may be done in the event that the recipient is in need of magnetic resonance imaging (MRI) of his or her head. Still further, if it is found that the transcutaneous bone conduction devices are insufficient for the recipient, the respective implantable plate 355 and/or the housing may be removed and an abutment may be attached to the bone fixture 246B in its place, thereby permitting conversion to a percutaneous bone conduction system. In summary, the interposition of the silicon layer between the implanted component and the skull reduces osseointegration, thus rendering removal of those components easier.

Also, the reduction in osseointegration resulting from the silicon layer may also add to the cumulative vibrational isolation of the implantable plate 355 and/or housing 454 because the components are not as firmly attached to the skull as they would otherwise be in the absence of the osseointegraiton inhibiting properties of the silicon layer. That is, osseointegration of the implantable plate 355 and/or housing 454 to the skull 136 may result in a coupling between the respective components and the skull 136 through which increased amounts of vibrational energy may travel directly to the skull 136 therethrough. This increased amount is relative to the amount that would travel from the respective components to the skull 136 in the absence of osseointegration. Further along these lines, some embodiments of the present invention include controlling the surface roughness of the implantable plate 355 and/or the housing 454 of the surfaces that might contact the skull 136. This is pertinent, for example, to embodiments that do not utilize a vibration isolator. In such embodiments, there may be direct contact between the vibratory element and the skull, such as, for example, embodiments consistent with that of FIG. 5C, and other embodiments where the vibratory element is raised above the skull, but the absence of the vibration isolator may permit bone tissue to grow between the vibratory element and the skull, thereby providing an alternate path for the vibration energy as detailed above. Such embodiments include implantable plate assemblies that are absent the vibration isolator (e.g., the implantable plate assembly 352 without silicon layer 353A) and housings that are absent the vibration isolator (e.g., the housing 452 without silicon layer 454A).

By way of example, the surface roughness of the bottom surface of implantable plate 355 and/or housing 452 may be polished, after the initial fabrication of the respective components, to have a surface roughness that is less conducive to osseointegration than is the case for other surface roughness values. For example, a surface roughness Ra value of less than 0.8 micrometers, such as about 0.4 micrometers or less, about 0.3 micrometers or less, about 2.5 micrometers or less and/or about 2 micrometers or less may be used for some portions of a surface or an entire surface of the implantable plate 355 that may come into contact with skull 136. This should reduce the amount of osseointegration and thus the amount of vibrational energy that is directed transferred from the implantable plate 355 to the skull 136 at the areas where the plate 355 contacts the skull 136.

Also, a reduction in osseointegration/the absence of osseointegration between the implantable plate 355 and/or the housing 454 may improve the likelihood that soft tissue and/or tissue that is less conducive to the transfer of vibrational energy than bone may grow between the respective components and the skull 136. This non-bone tissue may act as a vibration isolator having some or all of the performance characteristics of the other vibration isolators detailed herein. Additionally, the reduction in osseointegration/the absence of osseointegration between the implantable plate 355 and/or the housing 454 may likewise permit these components to be more easily removed from the recipient, such as in the case of an MRI scan of the recipient as detailed above.

In an exemplary embodiment, at least some of the surface roughness detailed above may be achieved through the use of electropolishing and/or by paste polishing. These polishing techniques may be used, for example, to reduce the surface roughness Ra of a titanium component to at least about 0.3 micrometers and 0.2 micrometers, respectively. Other methods of polishing a surface to achieve the desired surface roughnesses may be utilized in some embodiments of the present invention.

Some embodiments may include an implantable plate assembly 352 that includes both a ferromagnetic plate and a titanium component. In such an embodiment, the titanium component may be located between the ferromagnetic plate and the skull when the implantable plate assembly is fixed to the skull. For example, element 353A of FIG. 3, element 454A of FIG. 4 and/or element 353C of FIG. 5D may be made from titanium instead of silicon. The titanium component of these alternate embodiments may be polished to have one or more of the above surface roughnesses to inhibit osseointegration as detailed above.

As mentioned above, embodiments of the present invention may be implemented by converting a percutaneous bone conduction device to a transcutaneous bone conduction device. The following presents an exemplary embodiment of the present invention directed towards a method of converting a bone fixture system configured for use with a percutaneous bone conduction device to a bone fixture system configured for use with a transcutaneous bone conduction device.

In an exemplary embodiment, a surgeon or other trained professional including and not including certified medical doctors (hereinafter collectively generally referred to as a physicians) is presented with a recipient that has been fitted with a percutaneous bone conduction device, where the bone fixture system utilizes bone fixture 246B to which an abutment is connected via an abutment screw as is know in the art. More specifically, referring to FIG. 6, at step 610, the physician obtains access to a bone fixture of a percutaneous bone conduction device implanted in a skull, wherein an abutment is connected to the bone fixture 246B and extends through the skin of the recipient. At step 620, the physician removes the abutment from the bone fixture 246B. In the scenario where the abutment is attached to the bone fixture 246B via an abutment screw that extends through the abutment and is screwed into the bone fixture, this step further includes unscrewing the abutment screw from the bone fixture to remove the abutment from the bone fixture. At step 630, a vibratory element, such as the implanted plate assembly 352 in the case of a passive transcutaneous bone conduction device, is positioned beneath the skin of the recipient. In an exemplary embodiment, the vibratory element is slip fitted or interference fitted onto the bone fixture 246B, and screw 354 is screwed into the bone fixture to secure the vibratory element to the bone fixture, thereby at least one of maintaining or establishing the rigid attachment of the vibratory element to the bone fixture. It is noted that in some embodiments, the vibratory element includes a silicon layer already attached thereto. Thus, the method may effectively end at step 630. In other embodiments, the silicon layer is added later. Accordingly, an embodiment includes an optional later step, step 640, which entails positioning a vibration isolator between the vibratory element and the skull adjacent the bone fixture. In other embodiments, step 640 is performed before step 630 (the vibration isolator is first positioned on the skull and then the vibratory element is positioned on the vibration isolator).

Another exemplary embodiment of the present invention includes a method of converting a percutaneous bone conduction device such as the removable component of a percutaneous bone conduction device 720 used in a percutaneous bone conduction device to an external device 140 for use in a passive transcutaneous bone conduction device. The removable component of percutaneous bone conduction device 720 of FIG. 7 includes a coupling apparatus 740 configured to attach the bone conduction device 720 to an abutment connected to a bone fixture implanted in the recipient. The abutment extends from the bone fixture through muscle 134, fat 128 and skin 132 so that coupling apparatus 740 may be attached thereto. Such a percutaneous abutment provides an attachment location for coupling apparatus 740 that facilitates efficient transmission of mechanical force from the bone conduction device 700. A screw holds the abutment to the bone fixture. As illustrated, the coupling apparatus 740 includes a coupling 741 in the form of a snap coupling configured to "snap couple" to a bone fixture system on the recipient.

In an embodiment, the coupling 741 corresponds to the coupling described in U.S. patent application Ser. No. 12/177,091 assigned to Cochlear Limited. In an alternate embodiment, a snap coupling such as that described in U.S. patent application Ser. No. 12/167,796 assigned to Cochlear Limited is used instead of coupling 741. In yet a further alternate embodiment, a magnetic coupling such as that described in U.S. patent application Ser. No. 12/167,851 assigned Cochlear Limited is used instead of or in addition to coupling 241 or the snap coupling of U.S. patent application Ser. No. 12/167,796.

The coupling apparatus 740 is mechanically coupled, via mechanical coupling shaft 743, to a vibrating actuator (not shown) within the removable component of the percutaneous bone conduction device 720. In an exemplary embodiment, the vibrating actuator is a device that converts electrical signals into vibration. In operation, sound input element 126 converts sound into electrical signals. Specifically, the bone conduction device provides these electrical signals to the vibrating actuator, or to a sound processor that processes the electrical signals, and then provides those processed signals to vibrating actuator. The vibrating actuator converts the electrical signals (processed or unprocessed) into vibrations. Because vibrating actuator is mechanically coupled to coupling apparatus 740, the vibrations are transferred from the vibrating actuator to the coupling apparatus 740 and then to the recipient via the bone fixture system (not shown).

Figure 6:
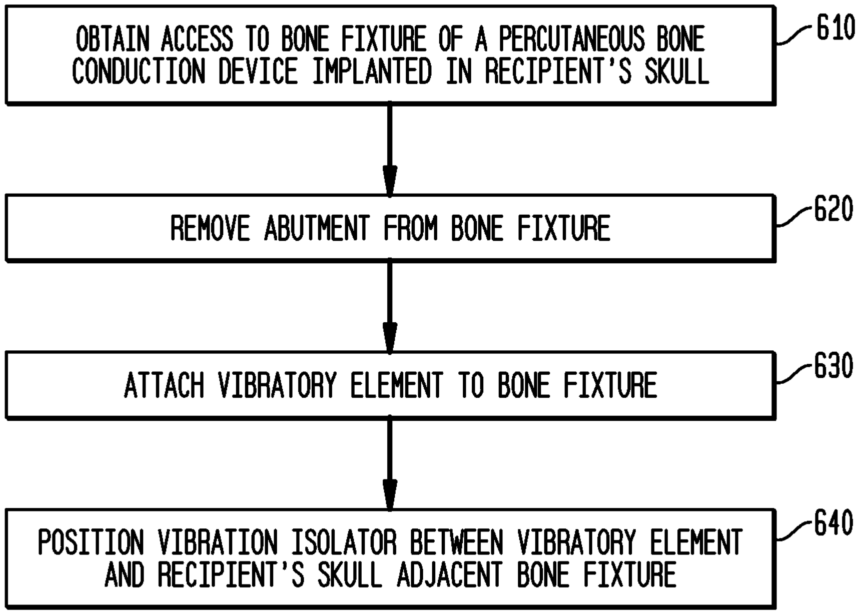
FIG. 6 depicts a flow chart detailing a method of converting a percutaneous bone conduction device to a transcutaneous bone conduction device according to an embodiment of the present invention.
Figure 8:
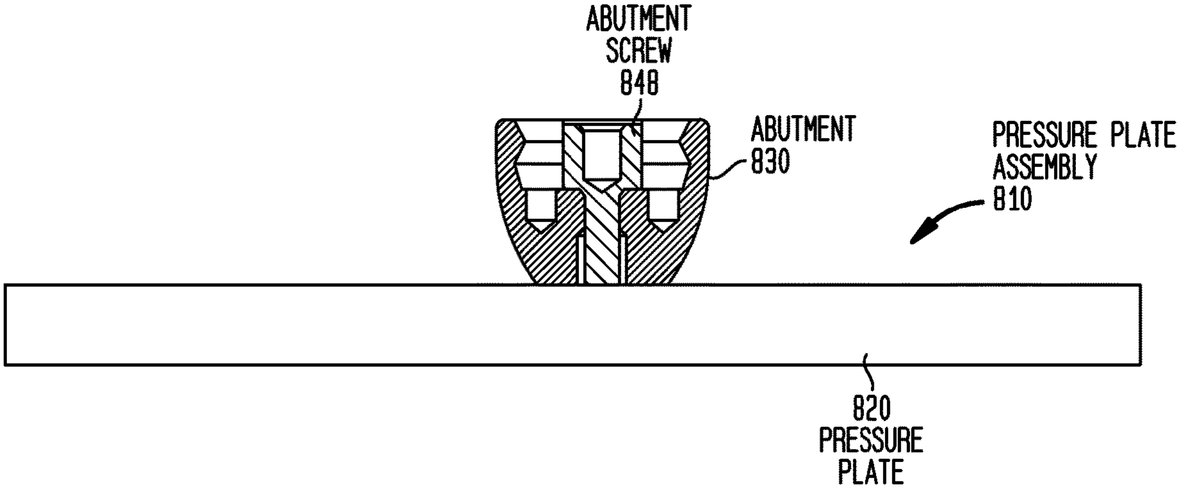
FIG. 8 is a schematic diagram illustrating an exemplary portion of the external device of a passive transcutaneous bone conduction device according to an embodiment of the present invention.

Once the abutment is removed from the bone fixture 246A or 246B (pursuant to, for example, the method detailed above with respect to FIG. 6), there is no abutment to which the coupling 741 of the removable component of the percutaneous bone conduction device 720 can couple. However, an embodiment of the present invention includes a pressure plate assembly 810 as seen in FIG. 8 that, when coupled to the removable component of the percutaneous bone conduction device 720, results in an external device that corresponds to an external device of a passive transcutaneous bone conduction device 940, as may be seen in FIG. 9.

Specifically, pressure plate 820 of pressure plate assembly 810 functionally corresponds to plate 346 detailed above with respect to FIG. 3, and percutaneous bone conduction device 720 functionally corresponds to vibrating actuator 342 detailed above with respect to FIG. 3. An abutment 830 is attached to pressure plate 820 via abutment screw 848, as may be seen in FIG. 8. In an exemplary embodiment, abutment 830 is an abutment configured to connect to bone fixture 246A and/or 246B as detailed above. In alternate embodiments, abutment 830 is attached to pressure plate 820 by other means such as, for example, welding, etc., or is integral with the pressure plate 820. Any system that will permit vibrations from the percutaneous bone conduction device 720 to be transmitted to the pressure plate 820 may be used with some embodiments of the present invention. As may be seen in FIG. 9, the abutment 830 permits the percutaneous bone conduction device 720 to be rigidly attached to the pressure plate assembly 810 in a manner the same as or substantially the same as the percutaneous bone conduction device 720 is attached to a bone fixture system. Thus, the existing percutaneous bone conduction device 720 can be reused in an external device of a transcutaneous bone conduction device.

Figure 9:
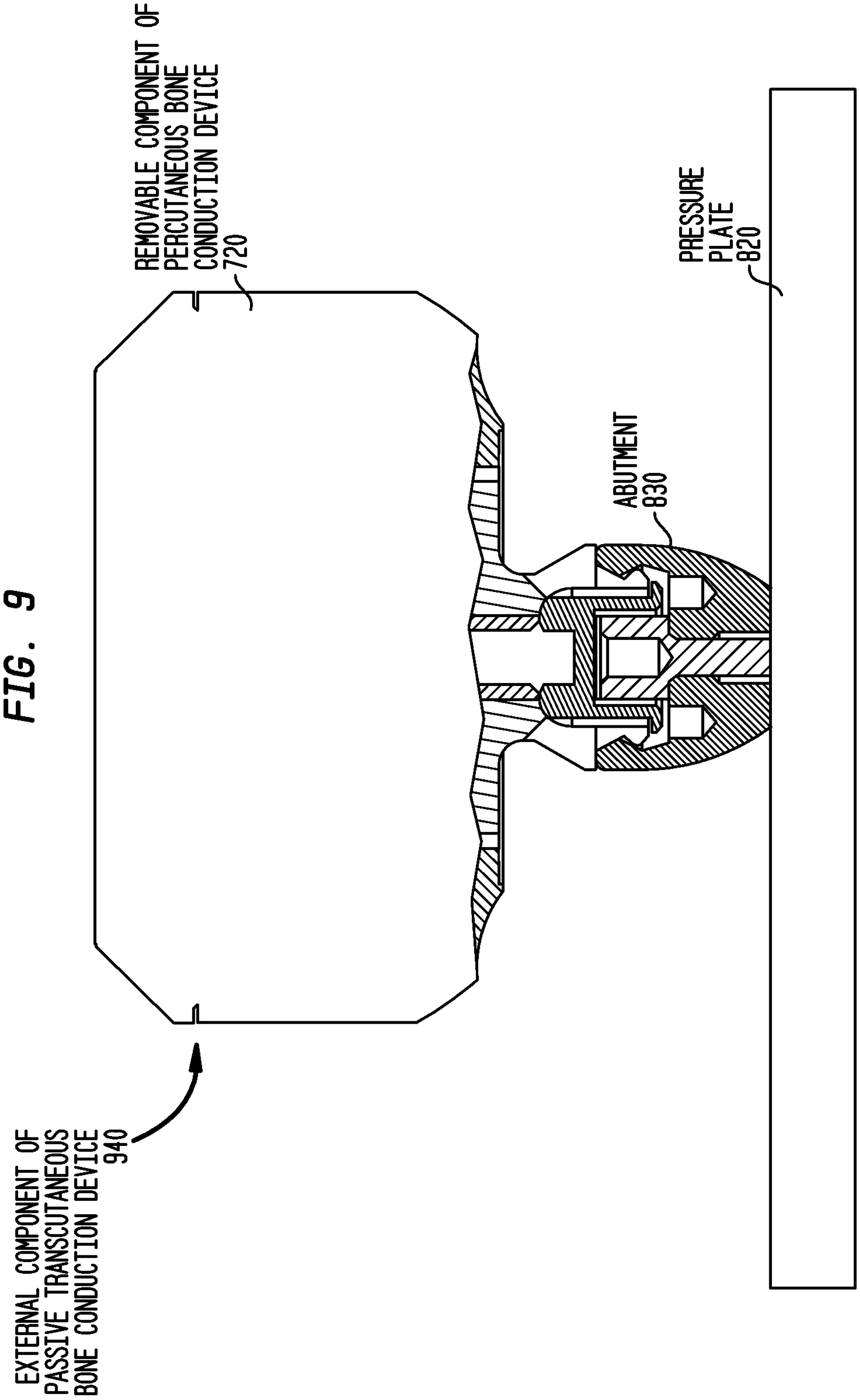
FIG. 9 is a schematic diagram illustrating an exemplary external device of a passive transcutaneous bone conduction device according to an embodiment of the present invention.
Figure 10:
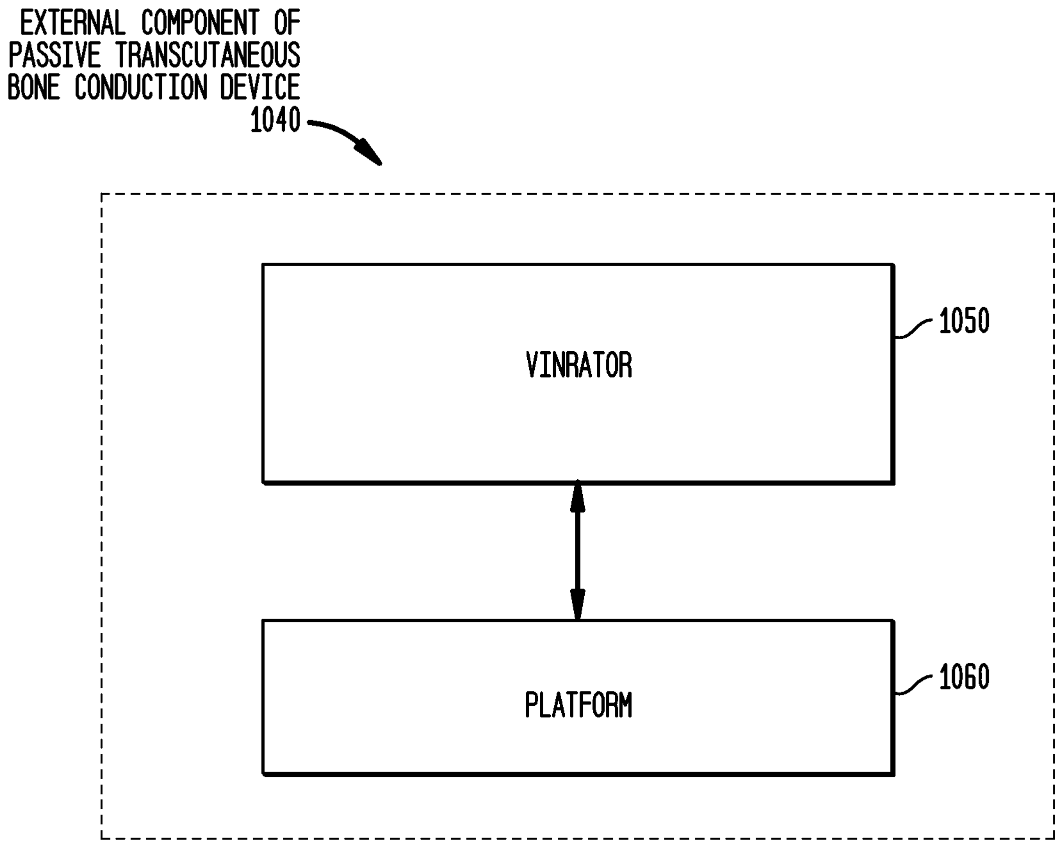
FIG. 10 is a functional diagram illustrating a exemplary external device of a passive transcutaneous bone conduction device according to an embodiment of the present invention.

FIG. 10 depicts a functional diagram of the external component of a bone conduction device 940 of FIG. 9. Specifically, FIG. 10 depicts an external component of a passive transcutaneous bone conduction device 1040 that comprises a vibrator 1050, such as the removable component of the percutaneous bone conduction device 720, and a platform 1060 configured to transfer vibrations from the vibrator to the skin of the recipient (thus corresponding to, in at least some embodiments, a pressure plate of a passive transcutaneous bone conduction device), such as, for example, pressure plate 820, wherein the vibrator 1050 and platform 1060 are configured to quick connect and/or quick release from one another, as represented by the double headed arrow.

In an exemplary embodiment, a quick connect/release coupling is utilized to enable the quick connect and quick release feature just detailed. The snap-coupling described above is one example of such a quick connect/release coupling. It is noted that the art often refers to a coupling that meets the quick release and quick connect features as a quick release coupling (or fitting) or a quick connect coupling (or fitting). That is, the art utilizes a naming convention that refers to only the connection or only the release feature for a device that satisfies both features. Such couplings (or fittings) are encompassed by the phrase "quick connect/release coupling" and quick release/connect coupling." In this regard, any device, system or method, regardless of naming convention, that will enable the feature of the quick connect and/or quick release to be achieved may be used in some embodiments.

It is further noted that embodiments detailed below that are disclosed as coupling one component to another, unless otherwise noted, encompass embodiments that both couple and decouple to and from, respectively, one another and embodiments that quick connect and quick release to and from, respectively, one another. It is also noted that embodiments detailed below that are disclosed as coupling one component to another, unless otherwise noted, encompass embodiments where the coupling is established by a quick connect/release coupling/quick release/connect coupling.

In some embodiments, vibrator 1050 and platform 1060 are configured to couple to one another in a manner that permits them to be uncoupled using applications of substantially equal force and/or torque to the pertinent components (albeit in at least some instances applied in opposite directions) and/or without the components experiencing any effective acceleration relative to one another during either operation. It is noted that additional operations may be associated with coupling and uncoupling such components. It is noted that embodiments detailed below that are disclosed as coupling one component to another, unless otherwise noted, can encompass embodiments that utilize a male threaded bolt screwed into a female threaded receptacle to couple components together, where the torque required to decouple the components is substantially the same as the torque required to couple the components together. That is, such an embodiment would be such that substantially no "breaking torque" need be applied to one of the components to decouple the components from one another (which may be the case if thread-locking compound or the like is used and/or if the male portion is driven into the female portion, or visa-versa, the full distance possible and/or if a lock collar is used or the like).

Some exemplary embodiments of the passive transcutaneous bone conduction device 1040 will now be described, along with exemplary coupling mechanisms configured to couple the vibrator 1050 to platform 1060.

In an exemplary embodiment, the system used to quick release and quick connect components together comprises a system that includes only two components that interface with one another to establish the coupling (e.g., such as that depicted in the embodiment of FIG. 9). This as contrasted to a system which may utilize, for example, two or more screws and corresponding bores to couple components together.

Platform 1060 may functionally correspond to a pressure plate of a passive transcutaneous bone conduction device or otherwise be configured to transmit hearing percept evoking vibrations, generated by the vibrator 1050 of an external component of a bone conduction device and transmitted to the pressure plate, into skin of a recipient to input the vibrations into an implanted vibrating component attached to bone of a recipient (e.g., pursuant to the operation of the embodiment of FIG. 3 detailed above, with or without the vibration isolation components detailed above). Additional details of platform 1060 are provided below.

Figure 11A:
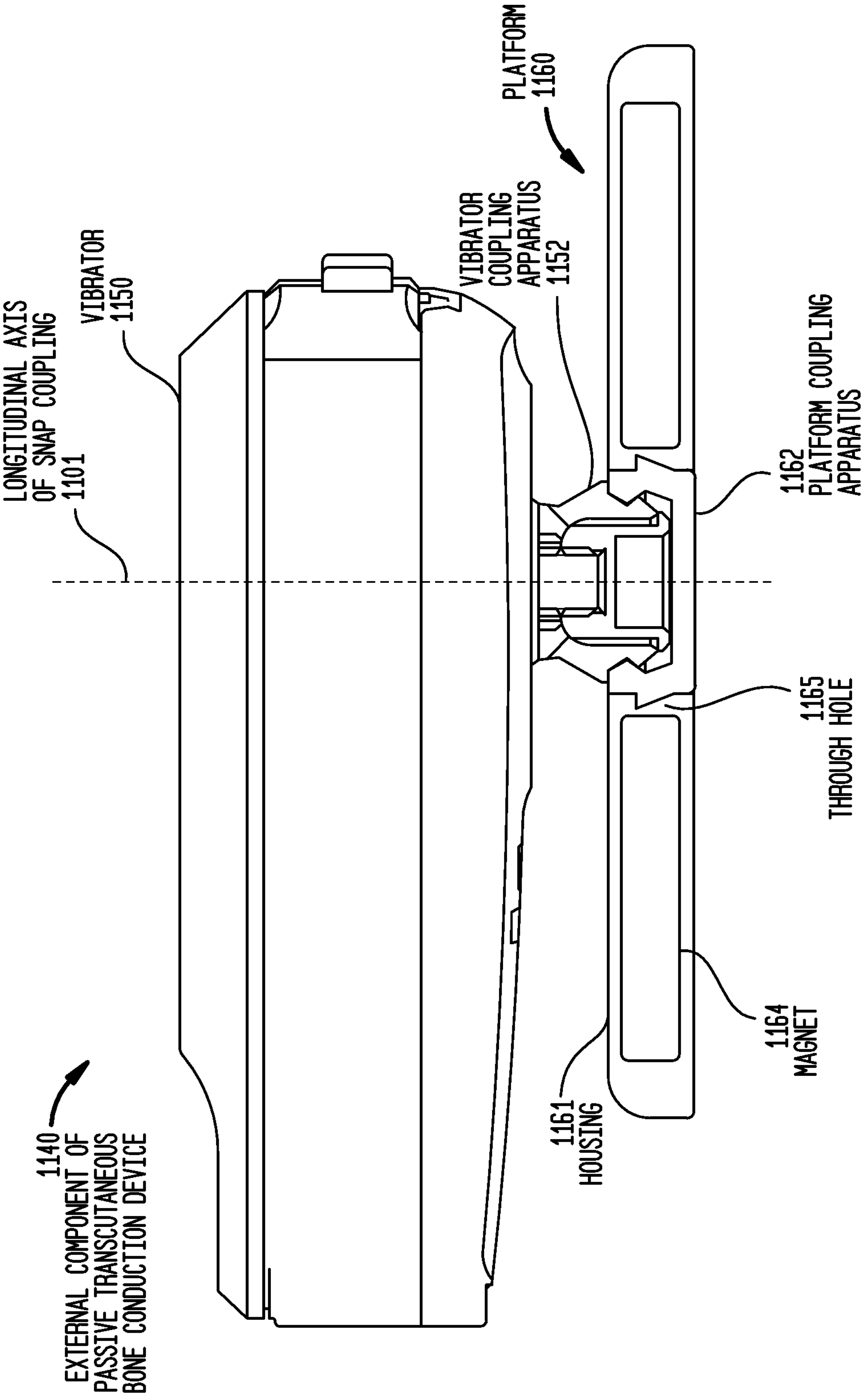
FIGS. 11A-11C are schematic diagrams illustrating an exemplary external device of a passive transcutaneous bone conduction device according to an embodiment of the present invention.

FIG. 11A depicts an exemplary embodiment of a passive transcutaneous bone conduction device 1140 that corresponds to the functional passive transcutaneous bone conduction device 1040 of FIG. 10. As with the embodiment of FIG. 9, vibrator 1150, which corresponds to a removable component of a percutaneous bone conduction device, platform 1160, are configured to snap-couple to one another. The embodiment of FIG. 11A depicts a passive transcutaneous bone conduction device 1140 that includes a snap coupling having a first sub-component (vibrator coupling apparatus 1152) that is part of vibrator 1150 and a second sub-component (platform coupling apparatus 1162) that is part of platform 1160. The snap coupling is configured to snap-couple vibrator 1150 to platform 1160 via movement of the sub-components relative to one another in a direction of longitudinal axis 1101 of the snap coupling.

FIG. 11A depicts cross-sectional views of platform 1160 and a portion of vibrator coupling apparatus 1152 of vibrator 1150. Coupling apparatus 1152 corresponds to coupling apparatus 740 detailed above with respect to FIG. 7. As may be seen in FIG. 11A, platform 1160 includes a housing 1161 in which a platform coupling 1162 is located. Housing 1161 functionally corresponds to pressure plate 820 detailed above with respect to FIG. 8. Further, platform coupling apparatus 1162 functionally corresponds to the coupling portion of abutment 830 detailed above with respect to FIG. 8. Also as may be seen in FIG. 11A, platform 1160 includes a magnet 1164 in the form of a ring magnet. In an exemplary embodiment, magnet 1164 is located entirely within housing 1161 and has a through-hole 1165 in which platform coupling 1162 is located. In an alternate embodiment, housing 1161 may not be present. Instead, magnet 1164 may directly interface with platform coupling apparatus 1162 or a connecting structure may connect the two components, and, optionally, a skin compatible coating may be applied about at least a portion of magnet 1164.

The embodiment of FIG. 11A differs in some respects to that of FIG. 9 in that instead of a skin-penetrating abutment bolted or otherwise mechanically connected to a pressure plate 820 such that abutment 830 and the entire coupling apparatus 740 stand proud of pressure plate 820, a portion of the vibrator coupling apparatus 1152 of vibrator 1150 extends into the housing 1161. That is, platform 1160 includes a cavity within the base of the platform. This as compared to the platform of FIG. 8 (i.e., pressure plate assembly 810), where the cavity of platform coupling apparatus 1162 into which vibrator coupling apparatus 1152 fits is located within structure (e.g., the abutment 830) that is proud of the base of the platform.

Figure 11B:
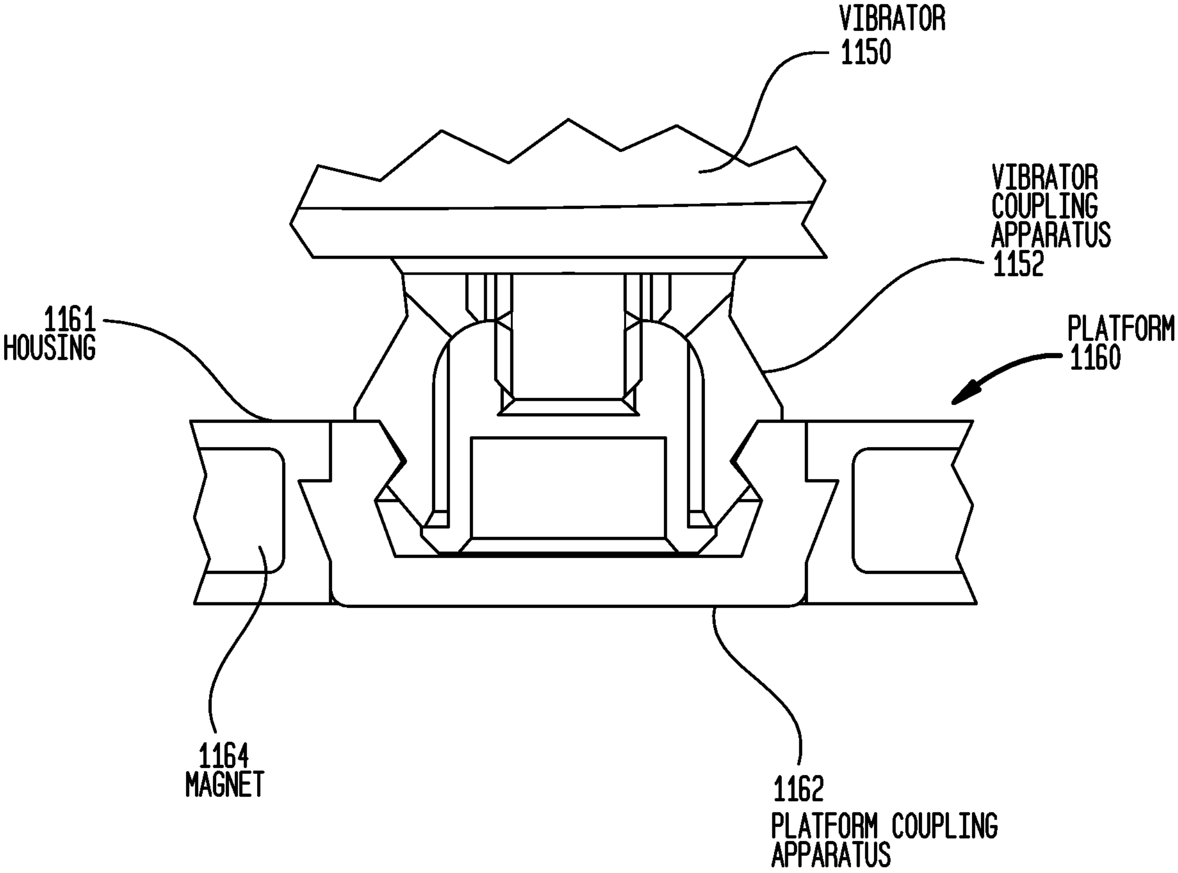

More specifically, with respect to FIG. 11B, which depicts a close-up view of the snap-coupling between vibrator 1150 and platform 1160, it can be seen that platform coupling apparatus 1162 is essentially located within an extrapolated outer profile of housing 1161. In the embodiment of FIG. 11A, housing 1161 is a base of the platform, whereas pressure plate 820 of FIG. 8 corresponds to the base of that platform (i.e., pressure plate assembly 810). Thus, the overall distance between the skin-facing side of housing 1161 and various geometric locations on vibrator 1150 (e.g., center of gravity, point furthest from the skin-facing side of housing 1161, sides, etc.) is minimized as compared to, for example, the distance to those same geometric locations with respect to the configuration of FIG. 9. This reduces the torque that may result between platform 1160 and vibrator 1150 in the event that a force is applied to the vibrator as compared to application of the same force on the arrangement of FIG. 9. Additional details to this minimization of the aforementioned distances is described below.

Figure 11C:
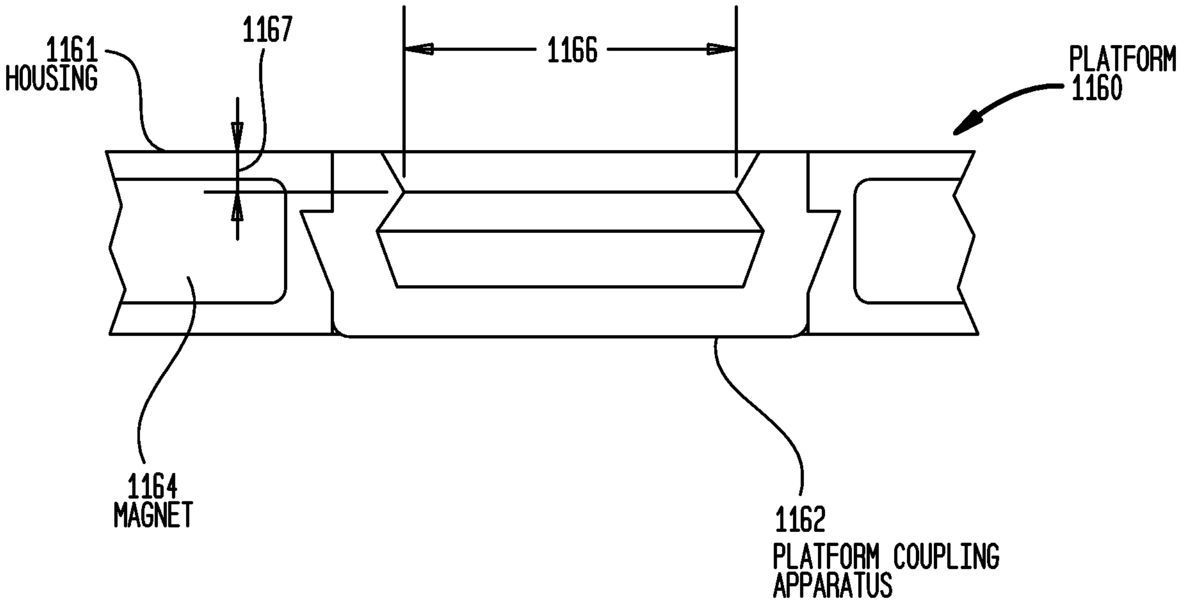

FIG. 11C depicts a close-up view of the portion of platform 1160 about platform coupling apparatus 1162. In an exemplary embodiment, diameter 1166 of the constriction of the female portion of platform coupling apparatus 1162 is about five millimeters and is located a distance 1167 of about two-thirds of a millimeter below the upper surface of platform coupling apparatus 1162. (The constriction of the female portion is a component of platform coupling apparatus 1162 with which male vibrator coupling apparatus 1152 interferes to form the snap-coupling.) It is noted that the embodiments of FIGS. 11A-11C, as well as those of other figures herein, should be considered drawn to scale or at least about to scale, although in other embodiments, the components depicted in the figures may have different proportions.

Figure 12:
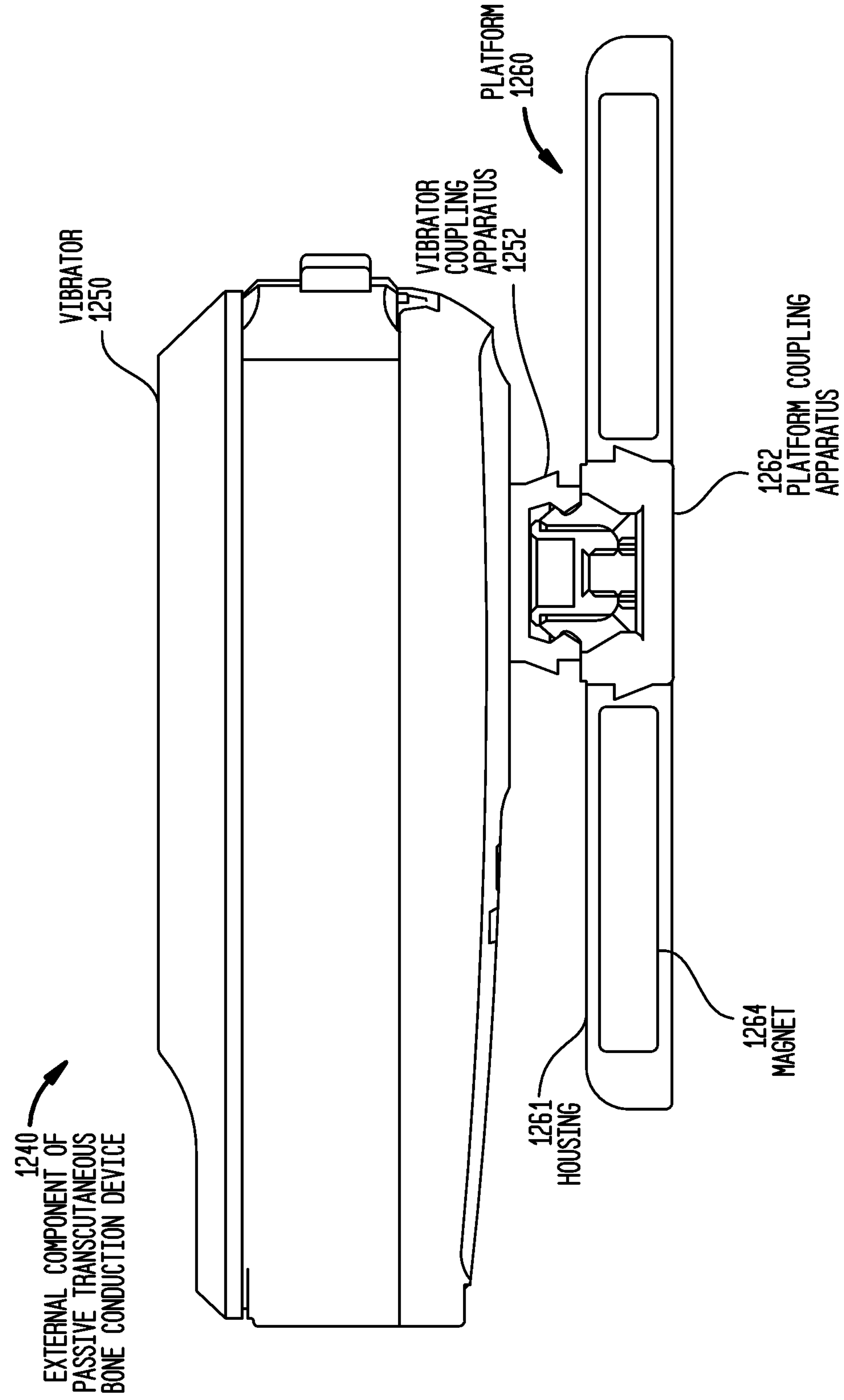
FIG. 12 is a schematic diagram illustrating an exemplary external device of a passive transcutaneous bone conduction device according to an embodiment of the present invention.

As will be understood from the configurations of FIGS. 9-11C, some exemplary embodiments are directed to an external component (e.g., 1140), that includes a snap coupling having a male component (e.g., 1152) that is part of the vibrator (e.g., 1150) and a female component (e.g., 1162) that is part of the platform (e.g., 1160), the snap coupling being configured to snap-couple the vibrator to the platform. Conversely, FIG. 12 depicts an alternate embodiment of an external component of a passive transcutaneous bone conduction device 1240 including a vibrator 1250 and a platform 1260 functionally corresponding to the vibrators and platforms detailed above. The embodiment of FIG. 12 differs from that of FIGS. 11A-11C in that instead of the male component of the snap coupling being part of the vibrator, the female component is part of the vibrator, and instead of the female component of the snap coupling being part of the platform, the male component is part of the platform. Specifically, as may be seen, vibrator coupling apparatus 1252 of vibrator 1250 substantially corresponds to platform coupling apparatus 1162 of the embodiment of FIGS. 11A-11C, and platform coupling apparatus 1262 of platform 1260 substantially corresponds to vibrator coupling apparatus 1152 of the embodiment of FIGS. 11A-11C, with the exception of possible variations to fit those components to the respective mating components of the vibrator and platform. In some embodiments, housing 1261 may correspond to housing 1161. Indeed, the outer profile of platform coupling apparatus 1262 that interfaces with housing 1261 may correspond to that of platform coupling apparatus 1162, thus permitting a standardized housing to be utilized for both embodiments. In the same vein, magnet 1264 may correspond to magnet 1164. Of course, different housings and magnets may likewise be used. Any configuration of any part of the vibrator and/or the platform may be used in some embodiments detailed herein and/or in variations thereof in at least some embodiments of the present invention.

Further, as may be seen from FIGS. 11A-12 platform coupling apparatus 1162/1262 is located within housing 1161/1261. In an exemplary embodiment, platform coupling apparatus 1162/1262 is press-fitted into housing 1161/1261 and is thus located in the through-hole of magnet 1164/1264. It is noted that in an exemplary embodiment of external components of percutaneous bone conduction devices that include a platform having a magnet with a through-hole, the ferro-magnetic component (e.g., magnet) of the implantable component with which the external component is utilized may likewise have a through-hole. Indeed, in some embodiments of the percutaneous bone conduction devices detailed herein and/or variations thereof, the magnet of the external component is substantially identical to the magnet of the internal component. Thus, an exemplary embodiment relating to a method of converting the transcutaneous bone conduction device to a percutaneous bone conduction device includes obtaining a platform having a magnet corresponding or at least substantially corresponding in size, shape and/or geometry to that of the implantable component of the bone conduction device that is already implanted in the recipient. Additional details on such a method are provided below.

Figure 13:
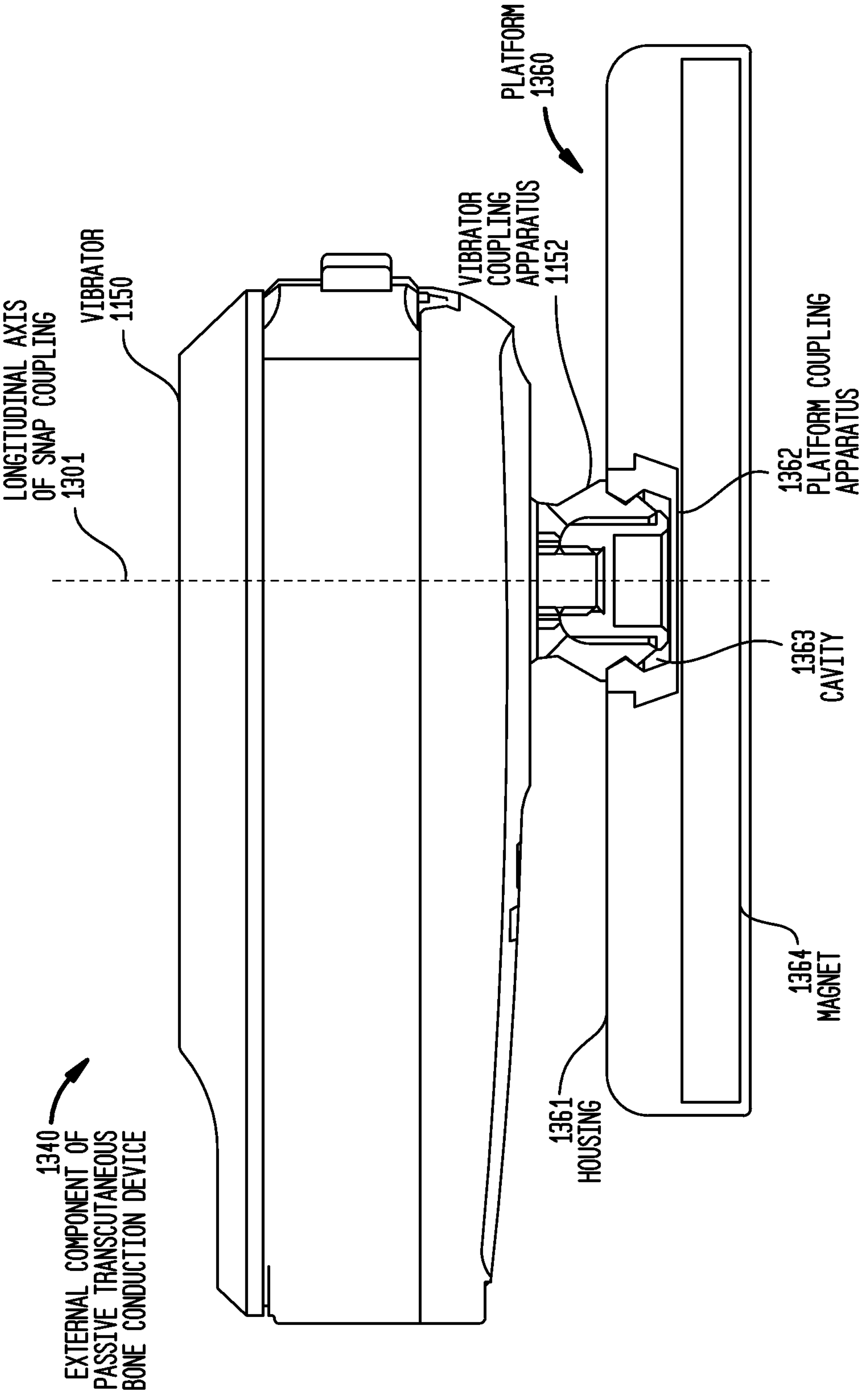
FIG. 13 is a schematic diagram illustrating an exemplary external device of a passive transcutaneous bone conduction device according to an embodiment of the present invention.

In the same vein, in some embodiments of the external component of the passive transcutaneous bone conduction devices, the magnet in the platform may not have a thorough-hole, such as may be the case when being used with an implantable component that likewise utilizes a magnet that does not have a through-hole (i.e., surfaces of the magnet form an enclosed magnet body, as opposed to that depicted in FIGS. 11A-11C, where surfaces of the magnet for an open magnet body) Accordingly, while the embodiments of FIGS. 11A-12 depicts magnets 1164 and 1264 as having a through-hole, other embodiments may have a magnet that does not have such a through-hole. Along these lines, FIG. 13 depicts a platform 1360 having such a configuration (housing 1361 holds platform coupling apparatus 1362 above magnet 1364 such that the cavity 1363 of the platform coupling apparatus 1362 is entirely above the magnet 1364) that is part of an external component of a passive transcutaneous bone conduction device 1340. As may be seen, bone conduction device 1340 utilizes the same vibrator 1150 as that of the embodiment of FIGS. 11A-11C. However, the platform 1360 utilizes a magnet 1364 where the surfaces thereof form a closed magnet body (e.g., there is no thorough-hole as with the magnet of FIGS. 11A-11C).

Figure 14:
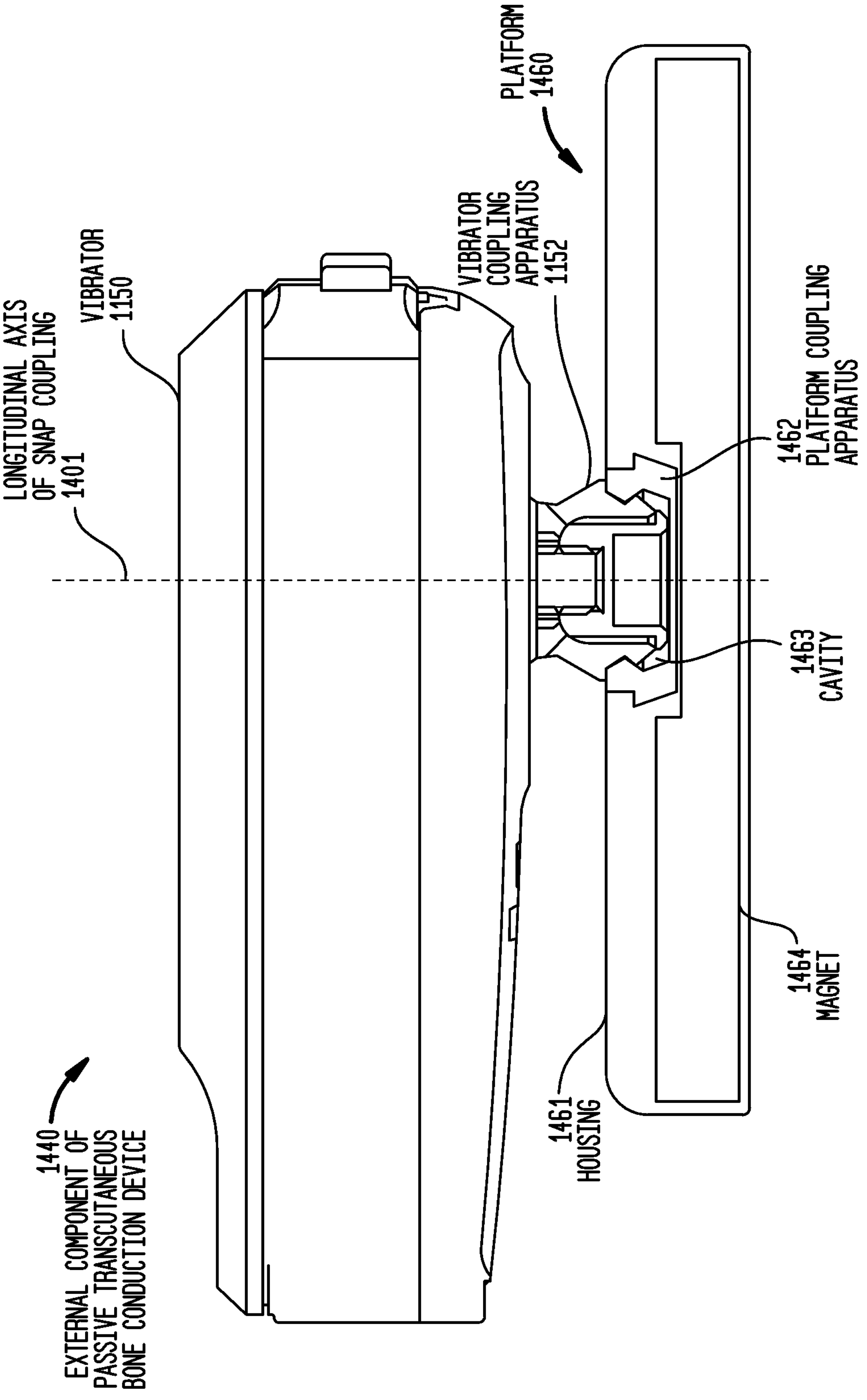
FIG. 14 is a schematic diagram illustrating an exemplary external device of a passive transcutaneous bone conduction device according to an embodiment of the present invention.

The embodiment of FIG. 13 depicts a snap coupling having a first sub-component (i.e., vibrator coupling apparatus 1152) that is part of the vibrator 1150 and second sub-component (i.e., the platform coupling apparatus 1362) that is part of the platform 1360, where the second sub-component is located between the magnet and the first sub-component. FIG. 14 depicts an alternate configuration of such an embodiment, where the magnet 1464 of housing 1461 of platform 1460 of the external component of the passive transcutaneous bone conduction device 1440 thereof has a recess in which the platform coupling apparatus 1462 (the second sub-component) is at least partially located. This as compared to the embodiment of FIGS. 11A-11C, in which the platform coupling apparatus 1162 sits in and is vertically aligned with the through-hole 1165, where the inner diameter of the through hole 1165 is greater than that of the platform coupling apparatus 1162, as well as the embodiment of FIG. 12.

Accordingly, the embodiment of FIG. 13 includes a snap coupling having a first sub-component 1152 that is part of the vibrator 1150 and a second sub-component 1362 that is part of the platform 1360, the snap coupling being configured to snap-couple the vibrator 1150 to the platform 1360 via movement of the sub-components relative to one another in a direction of a longitudinal axis 1301 of the snap coupling. Relative to position along the longitudinal axis 1301, the second sub-component 1362 is located completely above the magnet 1364 along a vector on the longitudinal axis 1301 extending away from the platform 1360 to the vibrator 1350. Note further that in the embodiment of FIG. 13, relative to position along the longitudinal axis, the cavity 1363 of the platform coupling apparatus 1362 into which a portion (the male portion) of the vibratory coupling apparatus 1152 is located completely above the magnet along a vector on the longitudinal axis extending away from the platform towards the vibrator.

In contrast to the embodiment of FIG. 13, the embodiment of FIG. 14 includes a snap coupling having a first sub-component 1152 that is part of the vibrator 1150 and a second sub-component 1462 that is part of the platform 1460, the snap coupling being configured to snap-couple the vibrator 1150 to the platform 1460 via movement of the sub-components relative to one another in a direction of a longitudinal axis 1401 of the snap coupling. Relative to position along the longitudinal axis 1401, at least a portion of the second sub-component 1462 overlaps with the magnet 1462 along a vector on the longitudinal axis. The embodiments of FIGS. 11A-12 share this feature as well, as may be seen. Note further that in the embodiment of FIG. 14, relative to position along the longitudinal axis, at least a portion of the cavity 1463 of the platform coupling apparatus 1462 into which a portion (the male portion) of the vibratory coupling apparatus 1152 is located overlaps with the magnet 1464.

Figure 15:
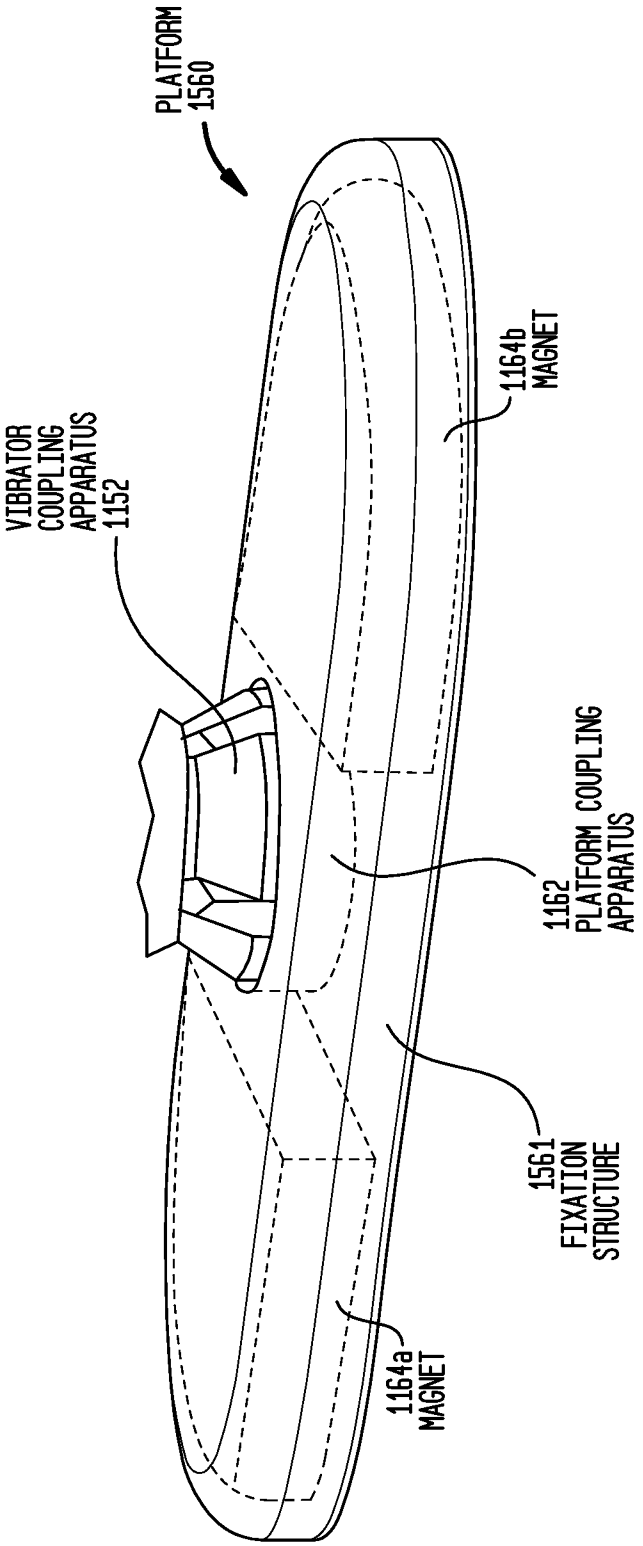
FIG. 15 is a schematic diagram illustrating an exemplary platform of a passive transcutaneous bone conduction device according to an embodiment of the present invention.

Embodiments detailed above have been described as having a platform that includes a single magnet. In some alternate embodiments, the platform may include two or more magnets. The magnets may be of substantially similar configuration (including the same configuration) or may be different from one another. FIG. 15 depicts a platform 1560 having such a configuration, with a portion of vibrator coupling apparatus 1152 depicted as being coupled to the platform coupling apparatus 1162. As may be seen, with reference to the orientation of FIG. 15, the platform 1560 includes a magnet 1164*a* to the left of the platform coupling apparatus 1162, and a magnet 1164*b* to the right of platform coupling apparatus 1162. In an exemplary embodiment, the platform 1560 includes a fixation structure 1561 that substantially fixes the spatial location of the first magnet relative to the second magnet and visa-versa. This fixation structure is fixed to the platform coupling apparatus 1162. In an exemplary embodiment, the fixation structure may comprise a polymer in which the magnets and the platform coupling apparatus are embedded (hence the depiction of these components in dashed lines), such that it fixes these components locationally together. In an alternate embodiment, the fixation structure may be one or more brackets or the like that fix the magnets to one another and/or to the platform coupling apparatus. In an exemplary embodiment, a housing may be used that is configured to hold the magnet to the platform, such as, by way of example, retaining the magnets in the housing with the platform coupling apparatus 1162 fixed to a housing wall thereof. It is noted that alternate embodiments of the fixation structure/housing may be used in cases where there is one magnet (applicable to such embodiments of FIGS. 11A-11C). Any device, system and/or method that fixes the spatial location of the magnets relative to one another and/or to the platform coupling apparatus may be used in some embodiments.

Figure 16A:
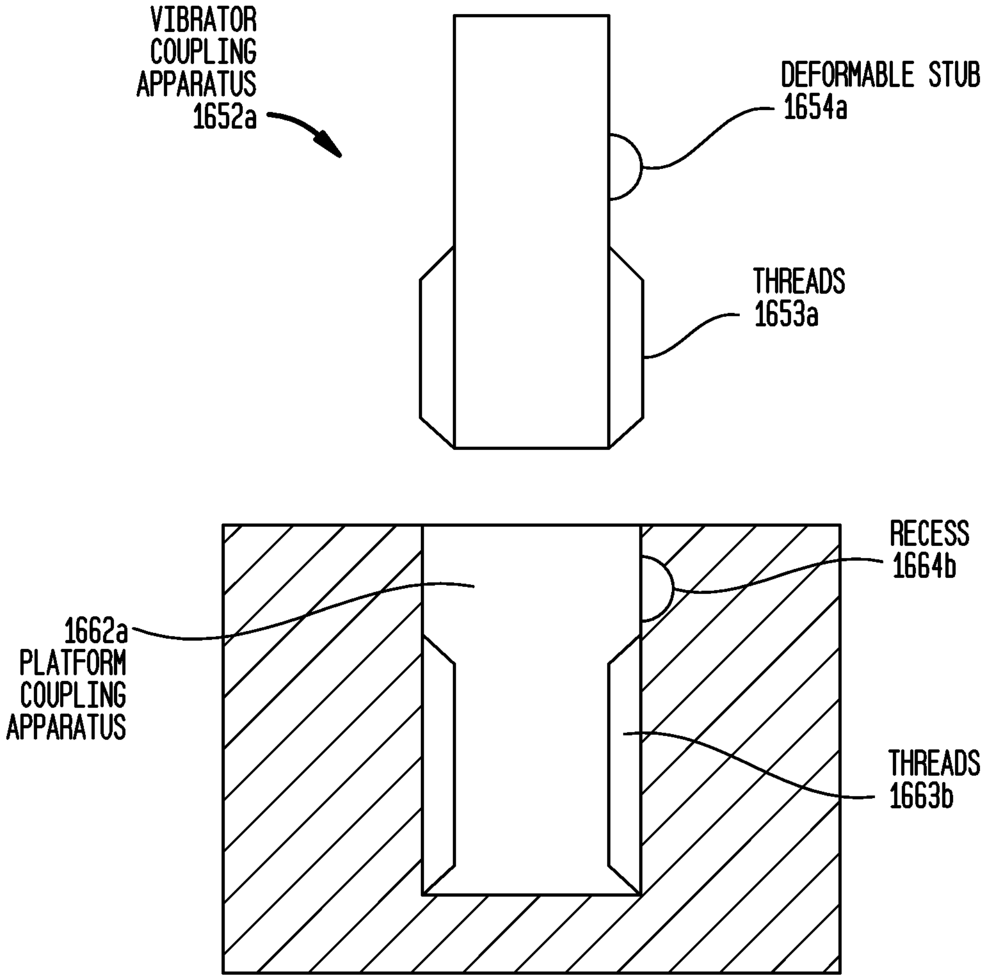
FIGS. 16A and 16B are schematic diagrams illustrating an exemplary coupling apparatus utilized in an exemplary external device of a passive transcutaneous bone conduction device according to an embodiment of the present invention.

Embodiments of the coupling apparatus used to couple the vibrator to the platform have been generally detailed above with respect to a snap-coupling (e.g., the embodiment of FIGS. 11A-15). Alternate coupling apparatuses may be used to couple the vibrator to the platform. For example, FIG. 16A depicts a screw-couple apparatus having a male threaded portion corresponding to vibratory coupling apparatus 1652*a* including threads 1653*a* and a female threaded portion corresponding to platform coupling apparatus 1662*a* including threads 1663*a*. In use, to couple the vibrator to the platform, the vibrator coupling apparatus 1652*a* is screwed into the platform coupling apparatus 1662*a*. One or both components are rotated relative to the other (e.g., by application of such rotation to the vibrator and/or the platform, respectively) so that the vibrator coupling apparatus 1652*a* is screwed into the platform coupling apparatus 1662*a*. This rotation is continued until deformable stub 1654*a*, which is elastically deformable under the conditions of use associated with this embodiment, is received in recess 1664*a*. This has the result of rotationally aligning the vibrator relative to the platform at a desired alignment and/or vertically positioning the vibrator relative to the platform at a desired vertical position. This also has the result of providing a minimum torque that must be applied to the vibrator and/or platform to uncouple the two coupled components, thereby providing a safeguard against certain levels of inadvertent uncoupling. That is, to uncouple the two components, torque at or above that which is necessary to sufficiently deform stub 1654*a* so as to remove stub 1654*a* from recess 1664*a* is applied to the vibrator and/or platform. Torque applied below this level will not permit the two components to be uncoupled from one another.

It is noted that the pitch of the threads 1663*b* and 1653*a* may be such that the screw-couple apparatus is a quick release/attach coupling.

While the embodiment of FIG. 16A has been presented in terms of a deformable stub 1654*a*, in an alternate embodiment, stub 1654*a* may be replaced with a ball-detent arrangement. While the embodiment depicted in FIG. 16A shows the male portion of the stub-recess feature as part of the vibrator coupling apparatus 1652*a*, in other embodiments, the male portion may be on the platform coupling apparatus 1662*a*.

Figure 16B:
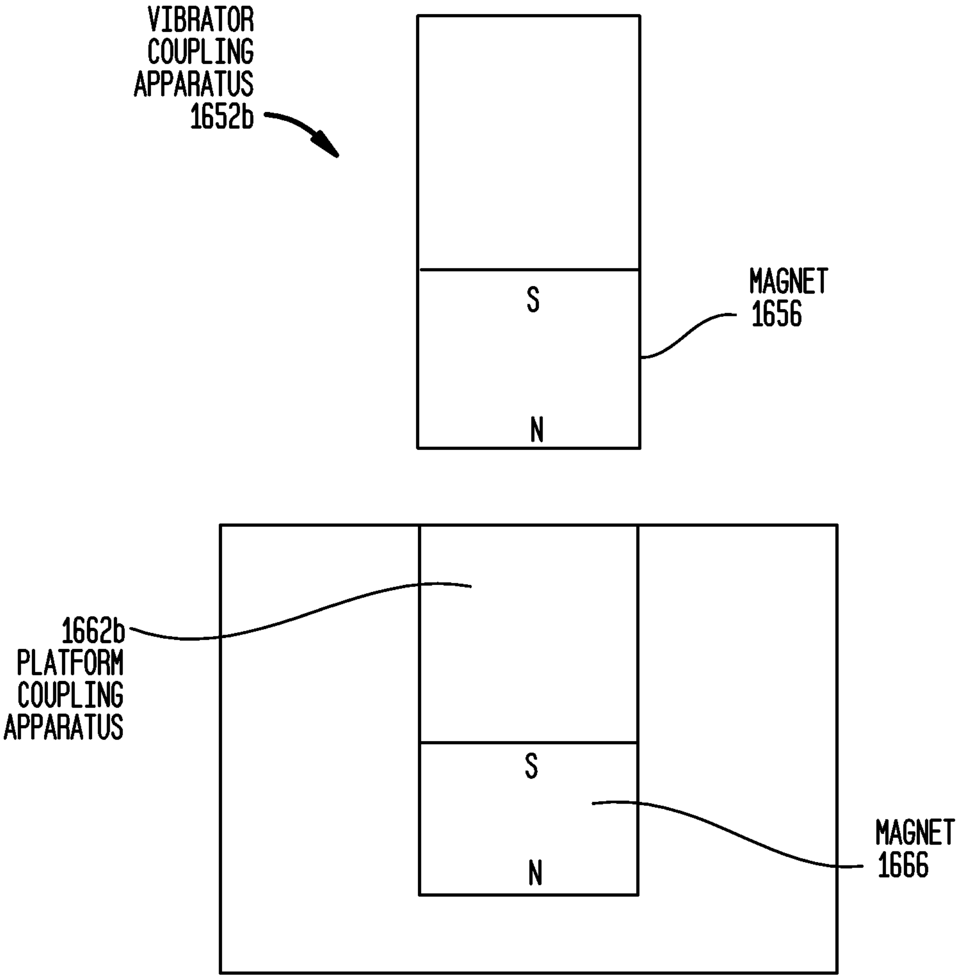

FIG. 16B depicts an alternate coupling apparatus used to couple the vibrator to the platform. As may be seen, there is male portion corresponding to vibratory coupling apparatus 1652*b* including a magnet 1656 and a female portion corresponding to platform coupling apparatus 1662*b* including magnet 1666. In use, to couple the vibrator to the platform, the vibrator coupling apparatus 1652*b* is inserted into the platform coupling apparatus 1662*b*. Owing to the fact that the poles of the magnets 1656 and 1666 are aligned as depicted in FIG. 16B, the magnets attract to one another, thus coupling the components together. To uncouple the two components from each other, force is applied to the vibrator in one direction and force is applied to the platform in an opposite direction sufficient to overcome the magnetic attraction between the two components. It will be understood that if the components are not firmly held or otherwise if proper reaction forces are not applied to the components during the coupling operation, the components will be drawn together and coupled as a result of the magnetic attraction between the two components. Thus, the force needed to couple the two components together may be much lower than that to uncouple the components. By application of sufficient force to the two components during the coupling operation to avoid any effective acceleration relative to one another, the force necessary to avoid such acceleration will be substantially the same as the force necessary to uncouple the two components. In this regard, it may be useful to utilize a testing machine or the like that can control the accelerations of the components to determine whether components meet the requirements.

In an embodiment, the magnetic attraction between magnets 1656 and 1666 falls within a range to establish the vibratory coupling apparatus 1652*b* as a quick release/attach coupling.

A range of materials may be used to implement embodiments detailed herein and/or variations thereof. In an exemplary embodiment, the platform coupling apparatuses and/or the vibrator coupling apparatuses detailed herein and/or variations thereof may be made entirely or substantially out of PEEK, titanium, stainless steel, aluminum, or other metal alloys. Alternatively, acrylic, epoxy or other polymers can be used to form the above apparatuses. In an exemplary embodiment, the housing of the platform/fixation structure of the platform/portions of the platform that interface with the skin of the recipient may be made entirely or substantially out of PEEK, acrylic, epoxy or other polymers.

Figure 17:
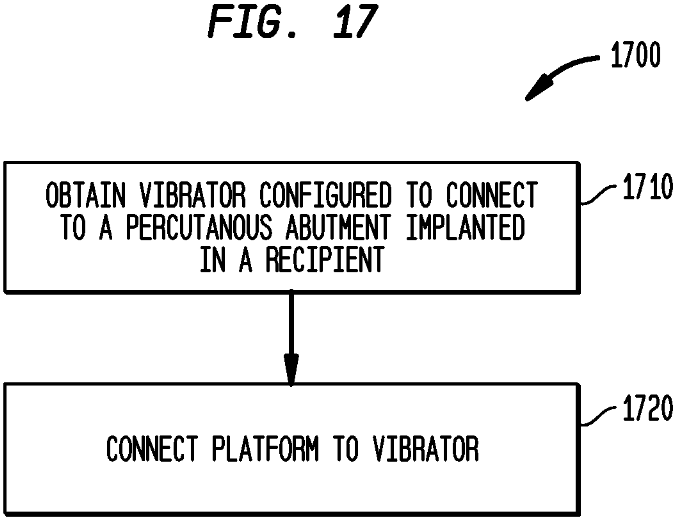
FIG. 17 depicts a flow chart detailing a method of converting a removable component of a percutaneous bone conduction device to an external component of a transcutaneous bone conduction device according to an embodiment of the present invention.

The embodiments of FIGS. 9-15 may have utilitarian value in that they may, alone and/or with additional components, allow for at least some methods of converting a removable component of a percutaneous bone conduction device (e.g., removable component 720 of FIG. 7, vibrator 1150 of FIGS. 11A-11C, 13 and 14, vibrator 1250 of FIG. 12, etc.) to an external component of a transcutaneous bone conduction device (e.g., functionally corresponding to external device 340 of FIG. 3). In this regard, FIG. 17 depicts an exemplary flow chart for such a method. Specifically, flow chart 1700 includes method step 1710, which entails obtaining a vibrator configured to connect to a percutaneous abutment implanted in a recipient, such as, for example, vibrator 1150. Upon obtaining such a vibrator, the method proceeds from step 1710 to step 1720, which entails connecting a platform (e.g., platform 1160, 1260, 1360, 1460 or 1560) to the vibrator. In at least some embodiments, the configuration of the vibrator is such that after attaching the platform thereto, no further modifications to the device are performed. In other embodiments, control circuitry of the vibrator may be replaced and/or control programming may be reprogrammed.

It is noted that there may be, in some embodiments, an intervening step between steps 1710 and 1720. More specifically, this intervening step may entail removing a first coupling component from the vibrator, the coupling component being configured to quick release and quick attach the vibrator from and to, respectively, a percutaneous abutment. This first coupling component may be in the form of the vibrator coupling apparatus 1152 of FIGS. 11A-11C (i.e., a snap-lock coupling). Alternatively or in addition to this, the intervening step may include attaching an attachment component, which may correspond to a second coupling component (which may be in the form of the vibrator coupling apparatus 1152 of FIGS. 11A-11C (i.e, a snap-lock coupling) to the vibrator at the location previously occupied by the first coupling component. This attachment component may conversely be in the form of, for example, screws, bolts, interference fit components. Further, the second coupling component may correspond to, for example, any of those detailed above with respect to FIGS. 16A-16D and/or variations thereof. In an exemplary embodiment, the attachment component is configured to attach the vibrator at least one of directly to the platform or to an attachment component of the platform. In an exemplary embodiment, the second coupling component is configured to couple the vibrator at least one of directly to the platform or to a coupling component of the platform.

In an exemplary embodiment, the just-described intervening steps may be executed to shorten a distance between the body of the vibrator and the platform, such as, for example, the distance between a center of gravity of the vibrator and a center of gravity of the platform. That is, changing a portion of or all of the coupling system of the prior bone conduction device when converting to the new device may result in shorter distances between the vibrator and the platform. In this regard, the new coupling system may reduce the overall distance between the skin-facing side of the housing and various geometric locations on the vibrator (e.g., center of gravity, point furthest from the skin-facing side of the housing 1161, sides, etc.).

Figure 18:
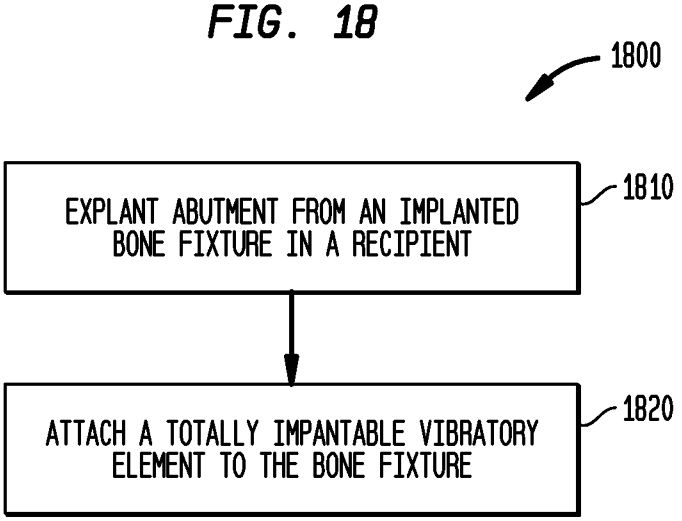
FIG. 18 depicts a flow chart detailing a method of converting the implantable portion of a percutaneous bone conduction device to an implantable component of a transcutaneous bone conduction device according to an embodiment of the present invention.

The method of FIG. 17 may be applicable to a vibrator that has been previously connected to a percutaneous abutment implanted in a recipient and utilized to evoke a hearing percept in the recipient via percutaneous bone conduction. That is, the vibrator need not be a new/unused vibrator. In an exemplary embodiment, the method of FIG. 17 permits a recipient currently furnished with a percutaneous bone conduction device (e.g., having a percutaneous bone conduction abutment fixed to bone of the recipient via a bone fixture (e.g., fixture 246A of FIG. 2A) and a vibrator coupled to the abutment) to be furnished with a passive transcutaneous bone conduction device without obtaining a new vibrator (i.e., by reusing the vibrator that is part of the furnished percutaneous bone conduction device) because the vibrator can be converted as detailed in flow chart 1700. FIG. 18 details an exemplary flowchart 1800 for such a scenario. Specifically, at step 1810, an abutment is explanted from an implanted bone fixture in a recipient. This may entail unscrewing an abutment screw that extends through the abutment into the bone fixture such that the abutment is removably attached to the bone fixture.

Upon sufficiently unscrewing the abutment, the abutment is removed from the bone fixture. Step 1820 entails attaching a totally implantable vibratory element to the bone fixture, thereby implanting the totally implantable vibratory element in the recipient. In an exemplary embodiment, the totally implantable vibratory element corresponds to implanted plate assembly 352 of FIG. 3, although in other embodiments, the totally implantable vibratory element may be of a different configuration (e.g., it may not include the silicon layer 353A). Step 1820 may entail inserting a screw that extends through the totally implantable vibratory element into the bone fixture into a bore in the bone fixture into which the abutment screw previously was inserted and screwing the screw therein to attach the totally implantable vibratory element to the bone fixture. In such an exemplary embodiment, the same bone fixture to which the abutment was attached may be the bone fixture to which the totally implantable vibratory element is attached. This may have utility in that the bone fixture may already be osseointegrated to the bone and the ability for use as a fixture for a bone conduction device is known and/or its performance capabilities are known or otherwise easily estimated. This may permit the now furnished passive transcutaneous bone conduction device to be regularly utilized to evoke a hearing percept within a shorter post-surgery time period/substantially shorter post-surgery time period than that which may be the case if there was a need or otherwise prudent reason to wait for a new bone fixture to osseointegrate to the bone.

Figure 19:
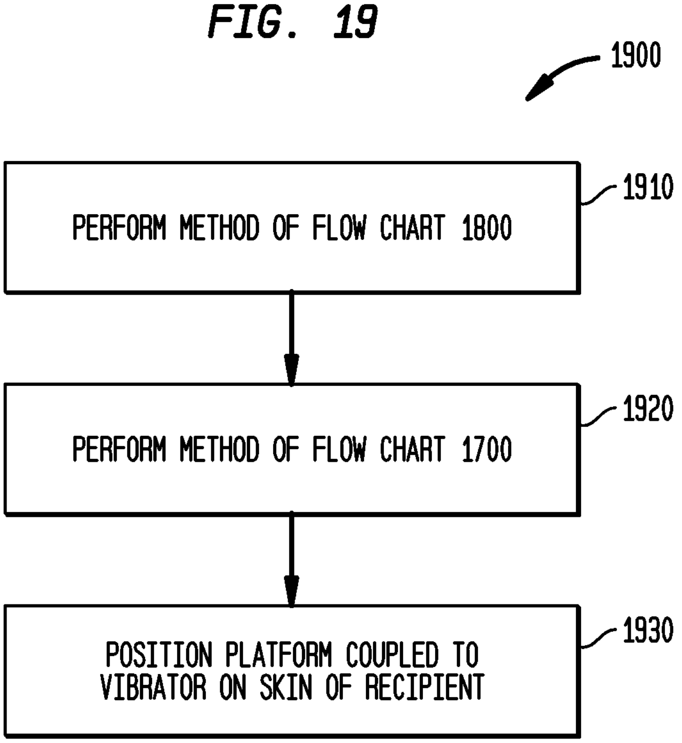
FIG. 19 depicts a flow chart detailing a method of converting a percutaneous bone conduction device to a transcutaneous bone conduction device according to an embodiment of the present invention.

The implanted vibratory element implanted in step 1820 may include an implantable magnetic component, which may be in the form of an implantable magnetic plate. Such magnetic components may correspond to those detailed herein and/or variations thereof. In an exemplary embodiment, the platform connected to the vibrator in step 1720 may also include a magnetic component, which may also be in the form of a magnetic plate. Such magnetic components may also correspond to those detailed herein and/or variations thereof. FIG. 19 presents a flow chart 1900 which details additional features of an exemplary method. Method step 1910 entails performing the method of flow chart 1800, and method step 1920 entails performing the method of flow chart 1700. It is noted that steps 1920 and 1910 may be performed in any order (i.e., step 1920 may be performed prior to 1910, etc.) Step 1930 entails positioning the platform coupled to the vibrator obtained by performing the method of flow chart 1700 on the skin of the recipient proximate the implanted totally implantable vibratory element implanted by performing the method of flow chart 1800. In embodiments where magnetic components are located in the platform/are part of the platform and are in the implanted vibratory element/part of the implanted vibratory element, the platform and thus the vibrator will be magnetically held to the recipient and, in at least some embodiments, aligned with the implanted vibratory element such that passive transcutaneous bone conduction may be practiced to evoke a hearing percept.

In an exemplary embodiment, the magnetic component of the platform may correspond to the magnetic component of the implantable vibratory element. In this regard, as noted above, in some embodiments of the passive bone conduction devices detailed herein and/or variations thereof resulting from conversion from a percutaneous bone conduction device, the magnet of the external component is substantially identical to the magnet of the internal component. For example, if the magnet of the external component has no through-hole, the magnet of the implantable component may likewise have no through-hole, and visa-versa. The outer diameter of the magnets may be the same/substantially the same. If the external component utilizes two or more magnets having a given location relative to one another, the external component may utilize the same number of magnets and may also have the same/substantially the same location relative to one another.

Accordingly, step 1930 of flow chart 1900 may include the action of establishing a magnetic field between the platform and the totally implantable vibratory element sufficient to hold the platform coupled to the vibrator against the skin of the recipient via the magnetic field.

Figure 7:
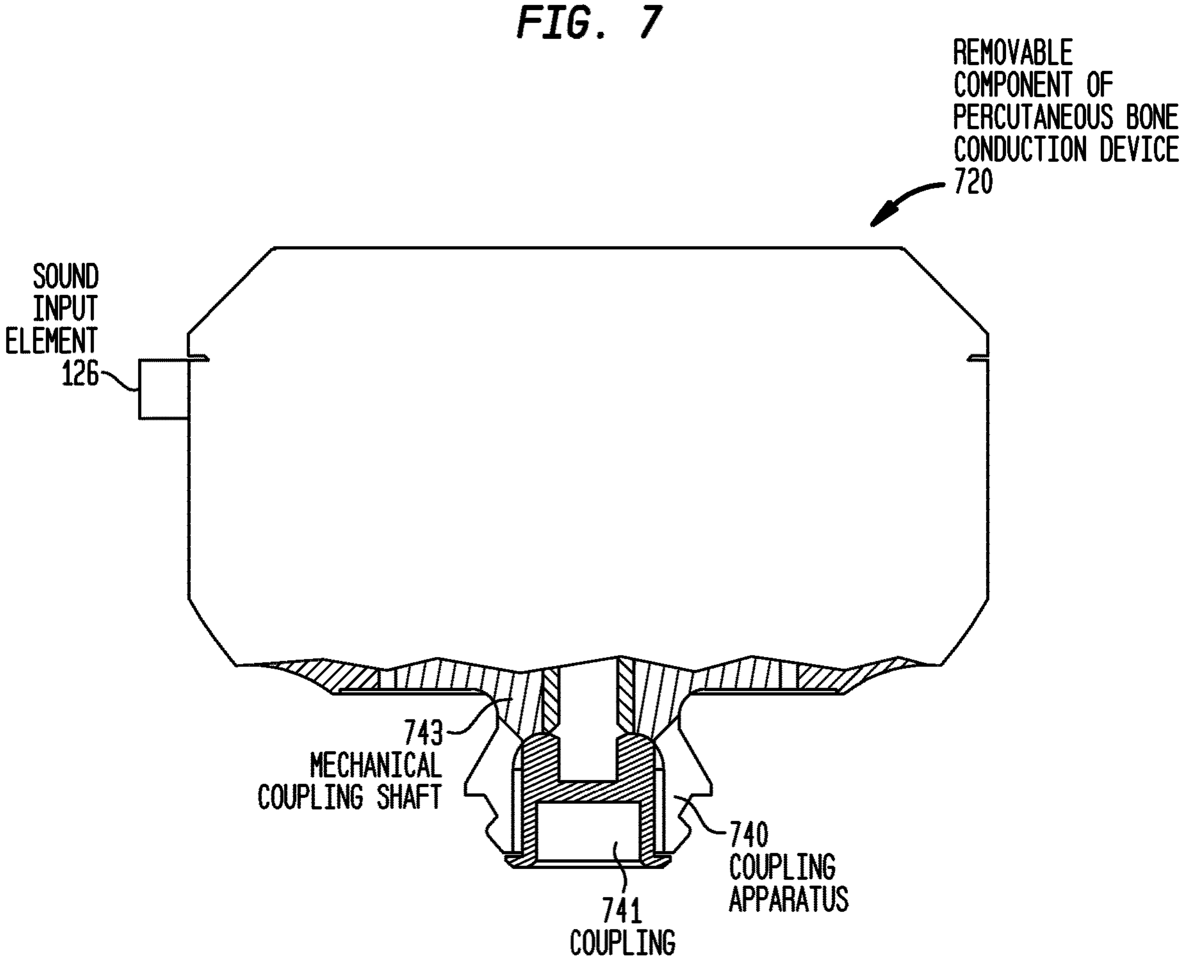
FIG. 7 is a schematic diagram illustrating a percutaneous bone conduction device with which an embodiment of the present invention may be used.
Figure 20:
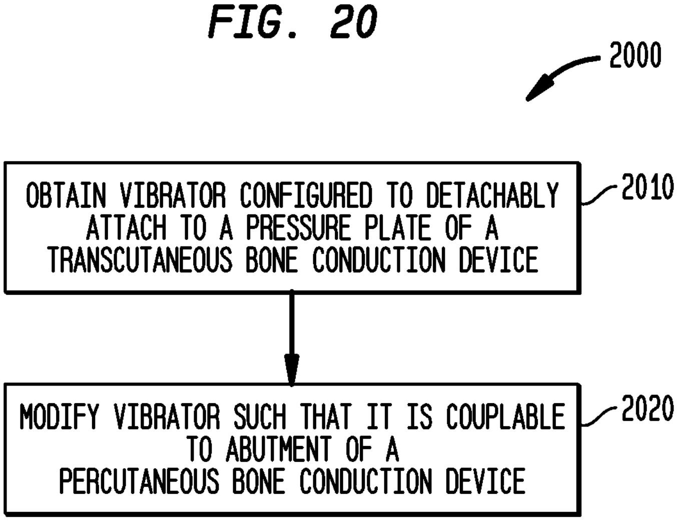
FIG. 20 depicts a flow chart detailing a method of converting an external component of a transcutaneous bone conduction device to a removable component of a percutaneous bone conduction device according to an embodiment of the present invention.

Exemplary methods according to some embodiments may include converting an external component of a transcutaneous bone conduction device (e.g., functionally corresponding to external device 340 of FIG. 3) to a removable component of a percutaneous bone conduction device (e.g., removable component 720 of FIG. 7, vibrator 1150 of FIGS. 11A-11C, 13 and 14, vibrator 1250 of FIG. 12, etc.). In this regard, FIG. 20 depicts an exemplary flow chart for such a method. Specifically, flow chart 2000 includes method step 2010, which entails obtaining a vibrator of a passive transcutaneous bone conduction device which is configured to detachably attach to a pressure place of the device. It is noted that while in some embodiments the obtained passive transcutaneous bone conduction device utilizes a snap-coupling or the like, and is thus configured to quick connect and disconnect to and from, respectively, the pressure plate, other embodiments may utilize more permanent manners of detachably attaching the pressure plate to the vibrator. Upon obtaining such a vibrator, the method proceeds from step 2010 to step 2020, which entails modifying the vibrator such that it can couple to an abutment of a percutaneous bone conduction device. This may entail removing a platform from the vibrator. In at least some embodiments, the configuration of the vibrator is such that after modifying the vibrator in step 2020, no further modifications to the device are performed. In other embodiments, control circuitry of the vibrator may be replaced and/or control programming may be reprogrammed.

It is noted that there may be, in some embodiments, an intervening step between steps 2010 and 2020. More specifically, this intervening step may entail removing an attachment component from the vibrator, the attachment component being configured to attach the vibrator to the pressure plate. This attachment component may be a first coupling component in the form of the vibratory coupling apparatus 1152 of FIG. 11A-11C (i.e., a snap-lock coupling). It also may be in the form of a screw, bolt, interference fit components, etc. Alternatively or in addition to this, the intervening step may include attaching a coupling component to the vibrator at the location previously occupied by the attachment component. This coupling component may correspond to, for example, the snap-lock couplings detailed above, or any of those detailed above with respect to FIGS. 16A-16B and/or variations thereof. In an exemplary embodiment, the coupling component is configured to couple the vibrator at least one of directly to an abutment or to a coupling component of an abutment.

In an exemplary embodiment, the just-described intervening steps may be executed to shorten a distance between the body of the vibrator and the abutment when coupled thereto, such as, for example, the distance between a center of gravity of the vibrator and a center of gravity of the abutment. That is, changing a portion of or all of the coupling system of the prior bone conduction device when converting to the new device may result in shorter distances between the vibrator and the abutment during use.

Figure 21:
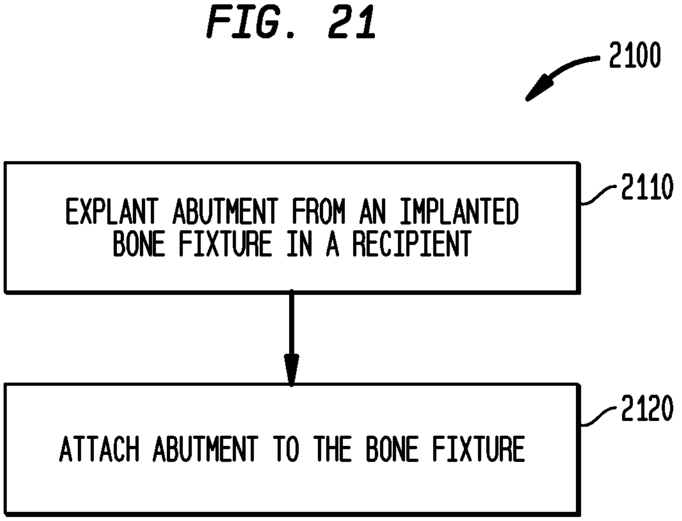
FIG. 21 depicts a flow chart detailing a method of converting the implantable component of a transcutaneous bone conduction device to an implantable portion of a percutaneous bone conduction device according to an embodiment of the present invention.

The method of FIG. 20 may be applicable to a vibrator that has been previously part of an external component of a passive transcutaneous bone conduction device utilized to evoke a hearing percept in the recipient via passive transcutaneous bone conduction. That is, the vibrator need not be a new/unused vibrator. In an exemplary embodiment, the method of FIG. 20 permits a recipient currently furnished with a passive transcutaneous bone conduction device (e.g., having a totally implantable vibrator element fixed to bone of the recipient via a bone fixture (e.g., fixture 246A of FIG. 2A) and a vibrator with a pressure plate configured to interface with skin of the recipient and be held thereto via a magnetic field between the external component and the implantable component) to be furnished with a percutaneous bone conduction device without obtaining a new vibrator (i.e., by reusing the vibrator that is part of the furnished passive transcutaneous bone conduction device) because the vibrator can be converted as detailed in flow chart 2000. FIG. 21 details an exemplary flowchart 2100 for such a scenario. Specifically, at step 2110, a totally implantable vibratory element is explanted from an implanted bone fixture in a recipient. This may entail unscrewing a screw that extends through the totally implantable vibratory element or that is otherwise attached to the totally implantable vibratory element from a bore in the bone fixture such that the totally implantable vibratory element is removably attached to the bone fixture.

It is noted that in an alternate embodiment, a method need not entail modification of the external component. In this regard, there may be embodiments where the external component of the passive transcutaneous bone conduction device is configured to couple to a pressure plate utilizing a mechanism that also corresponds to a mechanism that permits the vibrator of the external component to be coupled to an abutment. Thus, an exemplary method may entail obtaining the vibrator, wherein the vibrator is configured to be coupled to a platform that functions as a pressure plate of the passive transcutaneous bone conduction device. The method further entails uncouplably coupling the vibrator to an implanted percutaneous abutment implanted in a recipient. The just-described method may further include an intervening step which includes uncoupling the platform from the vibrator.

Once the totally implantable vibratory element is detached from the bone fixture, it is removed therefrom. Step 2120 entails attaching an abutment to the bone fixture, thereby implanting the totally implantable vibratory element in the recipient. Step 2120 may entail inserting a screw that extends through the abutment into a bore in the bone fixture into which the screw that held the totally implantable vibratory element to the bone fixture was previously inserted and screwing the screw therein to attach the abutment to the bone fixture. In such an exemplary embodiment, the same bone fixture to which the totally implantable vibratory element was attached may be the bone fixture to which the abutment is attached. This may have utility in that the bone fixture may already be osseointegrated to the bone and the ability for use as a fixture for a bone conduction device is known and/or its performance capabilities are known or otherwise easily estimated. This may permit the now furnished percutaneous bone conduction device to be regularly utilized to evoke a hearing percept within a shorter post-surgery time period/substantially shorter post-surgery time period than that which may be the case if there was a need to wait for a new bone fixture to osseointegrate to the bone.

Figure 22:
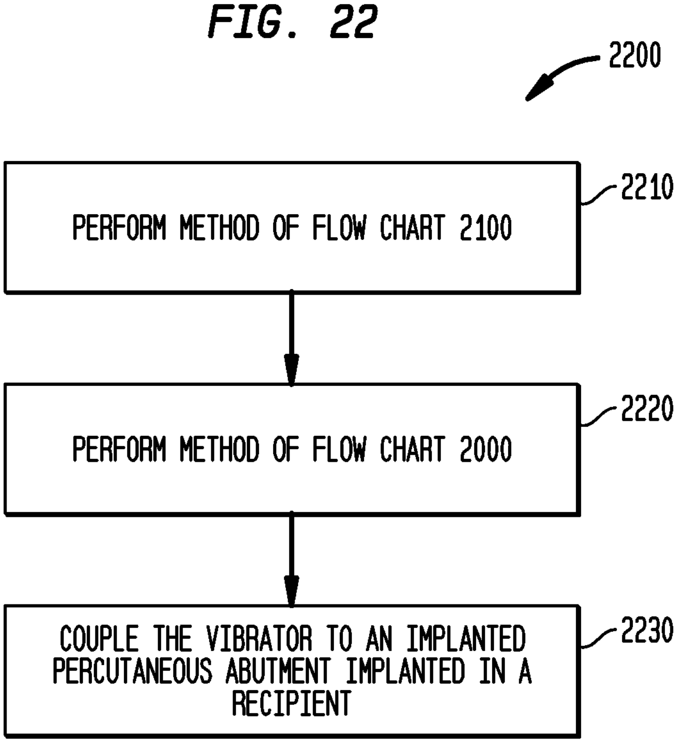
FIG. 22 depicts a flow chart detailing a method of converting a transcutaneous bone conduction device to a percutaneous bone conduction device according to an embodiment of the present invention.

FIG. 22 presents a flow chart 2200 which details additional features of an exemplary method. Method step 2210 entails performing the method of flow chart 2100, and method step 2220 entails performing the method of flow chart 2000. It is noted that steps 2220 and 2210 may be performed in any order (i.e., step 2220 may be performed prior to 2210, etc.) Step 2230 entails uncouplably coupling the vibrator obtained by performing the method of flow chart 2000 to the abutment implanted by performing the method of flow chart 2100. It is noted that in embodiments where the external component of the passive transcutaneous bone conduction device obtained in method step 2010 is configured to couple to a pressure plate utilizing a mechanism that also corresponds to a mechanism that permits the vibrator of the external component to be coupled to an abutment, the full method of flow chart 2100 may not be performed. Thus, an exemplary method may entail an alternate step to step 2210 that instead corresponds to obtaining a vibrator, wherein the vibrator is configured to be coupled to a platform that functions as a pressure plate of the passive transcutaneous bone conduction device. Steps 2220 and 2230 may be the same as detailed above.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:

obtaining a bone conduction vibrator; and connecting the vibrator to a skin interface apparatus via a coupling action.

2. The method of claim 1, wherein:

the coupling action includes placing a male component of one of the vibrator or the skin interface apparatus into a female component of the other of the vibrator or the skin interface apparatus.

3. The method of claim 1, wherein:

the coupling action establishes a temporary coupling and the coupling action establishes an external component of a passive transcutaneous bone conduction device.

4. The method of claim 1, further comprising:

disconnecting the skin interfacing apparatus from the vibrator via an uncoupling action.

5. The method of claim 4, wherein:

the uncoupling action is a snap uncoupling coupling action that includes removing a male component of one of the vibrator or the skin interface apparatus from a female component of the other of the vibrator or the skin interface apparatus.

6. The method of claim 5, further comprising:

after executing the uncoupling action, connecting, via a coupling action, the vibrator to a component that is not the skin interface apparatus that was previously coupled to the vibrator.

7. The method of claim 1, further comprising:

after connecting the skin interface apparatus to the vibrator, placing the skin interface apparatus against skin of the recipient and holding the vibrator and the skin interface apparatus against the skin by means other than a magnetic field;

capturing sound using a sound capture device supported by a housing of the bone conduction vibrator in which a vibrating actuator is located;

causing the vibrating actuator to vibrate based on the captured sound; and transferring vibrations from the vibrating actuator into the skin interfacing apparatus and then into skin of the recipient to evoke a hearing percept based on the captured sound.

8. An apparatus, comprising:

means for abutting outer skin of a human recipient; and means for connecting to a vibrational component of a bone conduction device.

9. The apparatus of claim 8, wherein:

at least a portion of the means for connecting is attached to a body of the means for abutting, wherein the means for connecting is configured to releasably couple the vibrational component and the body and transfer vibrations from the vibrational component so that the vibrations are transferred to the skin of the recipient.

10. An assembly, comprising:

the apparatus of claim 9; and the vibrational component, wherein the vibrational component is releasable coupled to the means for abutting, and the vibrational component is about as long as the means for abutting.

11. The apparatus of claim 8, wherein:

the means for abutting includes a through hole extending completely from a first side of the means for abutting to a second side of the means for abutting.

12. An assembly, comprising:

the apparatus of claim 8; and the vibrational component, wherein the vibrational component is releasable connected to the means for abutting by the means for connecting, and the assembly is configured to be held against the outer skin of the recipient in a manner other than that resulting from a magnetic field.

13. The apparatus of claim 8, wherein:

the means for coupling has a portion that is proud a body of the means for abutting.

14. An assembly, comprising:

the apparatus of claim 8; and the vibrational component, wherein the vibrational component is releasable coupled to the means for abutting by the means for connecting, and the releasable coupling is established by a male-female snap-coupling, a portion of which is established by the means for connecting, wherein the female portion of the releasable coupling has an interior diameter of no more than about 5 millimeters.

15. An assembly, comprising:

the apparatus of claim 8; and the vibrational component, wherein the vibrational component is releasable coupled to the means for abutting by the means for connecting, and the releasable coupling is established by a male-female snap-coupling, a portion of which is established by the means for connecting, wherein the female portion of the releasable coupling has an interior diameter of at least about 5 millimeters.

16. An assembly, comprising:

the apparatus of claim 8; and the vibrational component, wherein the vibrational component is releasable coupled to the means for abutting by the means for connecting, and with respect to a view looking at the vibrational component with the means for abutting on an opposite side of the vibrational component, the means for abutting extends beyond at least one side of the vibrational component.

17. The apparatus of claim 8, wherein:

the means for abutting is a multi-component assembly.

18. The apparatus of claim 8, wherein:

a portion of the means for connecting is embedded in the means for abutting.

19. The apparatus of claim 8, wherein:

the means for connecting extends completely from one side of the means for abutting to another side of the means for abutting.

20. An assembly, comprising:

the apparatus of claim 8; and the vibrational component, wherein the vibrational component is releasable coupled to the means for abutting by the means for connecting, and with respect to a view looking at a side of the assembly, the means for abutting extends beyond two sides of the vibrational component.

21. An assembly, comprising:

the apparatus of claim 8; and the vibrational component, wherein the vibrational component is releasable coupled to the means for abutting by the means for connecting, and with respect to a view looking at the vibrational component with the means for abutting on an opposite side of the vibrational component, the means for abutting extends beyond only two of four sides of the vibrational component.

22. A system, comprising:

an adapter; and a component including a vibrating actuator and a microphone, wherein the adapter is configured to adapt the component for interface with outer skin of a recipient.

23. The system of claim 22, wherein:

the system is a bone conduction system.

24. The system of claim 22, wherein:

when the adapter is attached to the component, the resulting assembly of the component and the adapter is an external component of a passive transcutaneous bone conduction device.

25. The system of claim 22, wherein:

the adapter includes a skin interface side and a first coupling component opposite the skin interface side; and the component includes a second coupling component; and the first coupling component and the second coupling component establish a male-female coupling when the first coupling component is coupled to the second coupling component.

26. The system of claim 25, wherein:

the male-female coupling is a snap coupling.

27. The system of claim 22, further comprising:

a percutaneous abutment, wherein when the component is attached to the percutaneous abutment, the resulting assembly of the component and the percutaneous abutment is a percutaneous bone conduction device.

28. The system of claim 25, wherein:

the male-female coupling is a quick connect/release coupling.

29. The system of claim 22, wherein:

the adapter is an assembly that includes a body portion and one of a male portion or a female portion of a snap coupling.

30. The system of claim 29, wherein:

the one of the male portion or the female portion extends through the body portion.

* * * * *